(12) United States Patent
Hu et al.

(10) Patent No.: US 11,888,149 B2
(45) Date of Patent: Jan. 30, 2024

(54) SOLID STATE BATTERY SYSTEM USABLE AT HIGH TEMPERATURES AND METHODS OF USE AND MANUFACTURE THEREOF

(71) Applicant: University of Maryland, College Park, College Park, MD (US)

(72) Inventors: Liangbing Hu, Hyattsville, MD (US); Chengwei Wang, College Park, MD (US); Eric D. Wachsman, Fulton, MD (US); Venkataraman Thangadurai, Calgary (CA)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 16/882,536

(22) Filed: May 24, 2020

(65) Prior Publication Data

US 2020/0358086 A1 Nov. 12, 2020

Related U.S. Application Data

(63) Continuation-in-part of application No. 16/847,582, filed on Apr. 13, 2020, which is a continuation-in-part of application No. 14/222,306, filed on Mar. 21, 2014, now Pat. No. 10,622,666.

(60) Provisional application No. 62/852,442, filed on May 24, 2019, provisional application No. 61/803,981, filed on Mar. 21, 2013.

(51) Int. Cl.
*H01M 4/136* (2010.01)
*H01M 4/58* (2010.01)
*H01M 10/0525* (2010.01)
*H01M 4/134* (2010.01)
*H01M 4/02* (2006.01)

(52) U.S. Cl.
CPC .......... *H01M 4/136* (2013.01); *H01M 4/134* (2013.01); *H01M 4/58* (2013.01); *H01M 10/0525* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 4,582,621 A | 4/1986 | Bell et al. | |
| 4,957,673 A | 9/1990 | Shroeder et al. | |
| 5,294,503 A | 3/1994 | Huang et al. | |
| 5,342,710 A | 8/1994 | Koksbang | |
| 5,434,021 A | 7/1995 | Fauteux | |

(Continued)

FOREIGN PATENT DOCUMENTS

| | | |
|---|---|---|
| CN | 1333576 | 1/2002 |
| CN | 101933100 | 12/2010 |

(Continued)

OTHER PUBLICATIONS

Office action from Japanese Patent Application No. 2019-110015 dated Sep. 2, 2020, and its English translation.

(Continued)

*Primary Examiner* — Carmen V Lyles-Irving
(74) *Attorney, Agent, or Firm* — Honigman LLP

(57) ABSTRACT

A battery cells that include sulfide cathodes are described with examples being suitable for operation at elevated temperatures. Also described are methods of making and using these battery cells.

21 Claims, 17 Drawing Sheets

(56) References Cited

U.S. PATENT DOCUMENTS

| | | | |
|---|---|---|---|
| 5,580,430 | A | 12/1996 | Balagopal et al. |
| 5,589,296 | A | 12/1996 | Iwamoto et al. |
| 5,894,656 | A | 4/1999 | Menon et al. |
| 6,218,049 | B1 | 4/2001 | Bates |
| 6,447,712 | B1 | 9/2002 | Dogan |
| 6,940,628 | B2 | 9/2005 | Giron et al. |
| 7,060,205 | B2 | 7/2006 | Monden et al. |
| 7,070,632 | B1 | 7/2006 | Visco |
| 7,713,466 | B2 | 5/2010 | Omori et al. |
| 8,227,105 | B1 | 7/2012 | Gerald, II et al. |
| 8,304,115 | B1 | 11/2012 | Petkov |
| 8,940,446 | B1 | 1/2015 | Holme |
| 9,252,455 | B1 | 2/2016 | Lin |
| 9,548,512 | B2 | 1/2017 | Liang |
| 9,590,228 | B1 | 3/2017 | Wang et al. |
| 10,622,666 | B2 | 4/2020 | Wachsman |
| 10,971,761 | B2 | 4/2021 | Hu |
| 2002/0136945 | A1 | 9/2002 | Call |
| 2002/0182508 | A1 | 12/2002 | Nimon et al. |
| 2003/0190520 | A1 | 10/2003 | Amine |
| 2004/0096737 | A1 | 5/2004 | Kin et al. |
| 2004/0191617 | A1 | 9/2004 | Visco |
| 2005/0008938 | A1 | 1/2005 | Cho |
| 2005/0175900 | A1 | 8/2005 | Yasuda et al. |
| 2006/0269813 | A1 | 11/2006 | Seabaugh et al. |
| 2007/0048617 | A1 | 3/2007 | Inda |
| 2007/0138020 | A1 | 6/2007 | Balagopal et al. |
| 2007/0148553 | A1 | 6/2007 | Weppner |
| 2008/0118826 | A1 | 5/2008 | Shimamura |
| 2008/0118836 | A1* | 5/2008 | Hwang ............... H01M 4/621 |
| | | | 429/219 |
| 2008/0138710 | A1 | 6/2008 | Liaw et al. |
| 2008/0182147 | A1 | 7/2008 | Blake |
| 2008/0241665 | A1 | 10/2008 | Sano |
| 2008/0286625 | A1 | 11/2008 | Sarker et al. |
| 2009/0061313 | A1 | 3/2009 | Tadano |
| 2009/0136830 | A1* | 5/2009 | Gordon ............ H01M 10/052 |
| | | | 429/50 |
| 2009/0197182 | A1 | 8/2009 | Katoh |
| 2009/0226790 | A1 | 9/2009 | Kanamura |
| 2009/0226816 | A1* | 9/2009 | Yoshida ............. C04B 35/447 |
| | | | 429/304 |
| 2010/0216032 | A1 | 8/2010 | Baba |
| 2010/0308253 | A1* | 12/2010 | Swift .................... H01M 4/483 |
| | | | 252/62.2 |
| 2010/0331170 | A1 | 12/2010 | Balagopal |
| 2011/0104526 | A1 | 5/2011 | Boxley et al. |
| 2011/0149473 | A1 | 6/2011 | Eilertsen |
| 2011/0206980 | A1* | 8/2011 | Yerramalli ........... H01M 10/39 |
| | | | 429/163 |
| 2011/0244337 | A1* | 10/2011 | Ohta ................. H01M 10/0562 |
| | | | 429/319 |
| 2012/0021297 | A1 | 1/2012 | Hauser |
| 2012/0199785 | A1 | 8/2012 | Saka |
| 2012/0264017 | A1 | 10/2012 | Nazri et al. |
| 2013/0004830 | A1 | 1/2013 | Song |
| 2013/0202960 | A1 | 8/2013 | Kim |
| 2013/0216903 | A1 | 8/2013 | Pitteloud |
| 2013/0216910 | A1 | 8/2013 | Obrovac |
| 2013/0260257 | A1 | 10/2013 | Choi |
| 2013/0295469 | A1 | 11/2013 | Liang et al. |
| 2013/0323603 | A1* | 12/2013 | Ryu ..................... H01M 4/80 |
| | | | 429/320 |
| 2014/0038054 | A1 | 2/2014 | Tojigamori |
| 2014/0080006 | A1 | 3/2014 | Ogasa |
| 2014/0170465 | A1 | 6/2014 | Visco et al. |
| 2014/0223730 | A1 | 8/2014 | Larsen |
| 2014/0272595 | A1 | 9/2014 | Cristadoro |
| 2014/0287305 | A1 | 9/2014 | Wachsman et al. |
| 2014/0299820 | A1 | 10/2014 | Harandek et al. |
| 2015/0044575 | A1 | 2/2015 | Kawaji |
| 2015/0050543 | A1 | 2/2015 | Christensen et al. |
| 2015/0056519 | A1 | 2/2015 | Ohta |
| 2015/0056520 | A1 | 2/2015 | Thokchom |
| 2015/0064537 | A1 | 3/2015 | Christensen |
| 2015/0099188 | A1 | 4/2015 | Holme |
| 2015/0099190 | A1 | 4/2015 | Holme |
| 2015/0111110 | A1 | 4/2015 | Watanabe |
| 2015/0147659 | A1 | 5/2015 | Kato |
| 2015/0229000 | A1 | 8/2015 | Shao et al. |
| 2015/0311562 | A1 | 10/2015 | Le Van-Jodin |
| 2016/0028103 | A1 | 1/2016 | Yokoyama |
| 2016/0141580 | A1 | 5/2016 | Sommer et al. |
| 2016/0167132 | A1 | 6/2016 | Panat |
| 2016/0204427 | A1 | 7/2016 | Vereecken |
| 2016/0351973 | A1 | 12/2016 | Albano |
| 2016/0372729 | A1 | 12/2016 | Archer |
| 2017/0005367 | A1 | 1/2017 | Van Berkel |
| 2017/0022112 | A1 | 1/2017 | Karpenko |
| 2017/0098824 | A1 | 4/2017 | Fasching |
| 2017/0162911 | A1 | 6/2017 | Gaben |
| 2017/0288232 | A1 | 10/2017 | Herle |
| 2018/0102571 | A1 | 4/2018 | Sakamoto |
| 2019/0058217 | A1 | 2/2019 | Ahn |
| 2020/0028156 | A1 | 1/2020 | Zhang |
| 2020/0358086 | A1 | 11/2020 | Hu et al. |

FOREIGN PATENT DOCUMENTS

| | | |
|---|---|---|
| CN | 103313937 | 9/2013 |
| CN | 105636921 | 6/2016 |
| CN | 106165154 | 11/2016 |
| EP | 2099087 | 9/2009 |
| EP | 3753034 | 12/2020 |
| JP | 60-001768 | 1/1985 |
| JP | 11-283664 | 10/1999 |
| JP | 2000100471 | 4/2000 |
| JP | 2001-076533 | 3/2001 |
| JP | 2004-063397 | 2/2004 |
| JP | 2006-032143 | 2/2006 |
| JP | 2006-260887 | 9/2006 |
| JP | 2008-226666 | 9/2008 |
| JP | 2008-251225 | 10/2008 |
| JP | 2009-054455 | 3/2009 |
| JP | 2009-181920 | 8/2009 |
| JP | 2009238739 | 10/2009 |
| JP | 2009-259696 | 11/2009 |
| JP | 2010015782 | 1/2010 |
| JP | 2010-108810 | 5/2010 |
| JP | 2010-218686 | 9/2010 |
| JP | 2010202499 | 9/2010 |
| JP | 2013008671 | 1/2013 |
| JP | 2013232284 | 11/2013 |
| JP | 2014-072009 | 4/2014 |
| JP | 2014-096350 | 5/2014 |
| WO | 2008059987 | 5/2008 |
| WO | 2009108184 | 9/2009 |
| WO | 2013140565 | 9/2013 |
| WO | 2013/161310 | 10/2013 |
| WO | 2014010043 | 1/2014 |
| WO | 2014153534 | 9/2014 |
| WO | 20160210371 | 1/2016 |
| WO | 2016057426 | 4/2016 |
| WO | 2016069749 | 5/2016 |
| WO | 2016094651 | 6/2016 |
| WO | 2017116599 | 7/2017 |
| WO | 2017190135 | 11/2017 |
| WO | 2018068034 | 4/2018 |
| WO | 2018184007 | 10/2018 |
| WO | 2018184010 | 10/2018 |
| WO | 2019160993 | 8/2019 |

OTHER PUBLICATIONS

Zhao, L., et al., "Disodium Terephthalate ($Na_2C_8H_4O_4$) as High Performance Anode Material for Low-Cost Room Temperature Sodium-Ion Battery" in Advanced Energy Materials, 2012, vol. 2, Issue 8, p. 962-965, published Aug. 2012. PDF file.

Osamu Yamamoto, "Solid oxide fuel cells: fundamental aspects and prospects," Electrochimica Acta 45 (2000), 2423-2435.

(56) References Cited

OTHER PUBLICATIONS

Extract from Sigma Aldrich website, (https://www.sigmaaldrich.com/catalog/product/sial/s4126?lang=en&region=GB), downloaded Aug. 5, 2019.
Abstract from Murugan, R. Thangadurai, V., and Weppner, W. (2007), Fast Lithium Ion Conduction in Garnet-Type $Li_7La_3Zr_2O_{12}$. Angewandte Chemie, International Edition, 46: 7778-7781 presented in EPO opposition related to EP Patent No. 2976798.
Murugan, R. Thangadurai, V., and Weppner, W.. (2007), Fast Lithium Ion Conduction in Garnet-Type $Li_7La_3Zr_2O_{12}$. Angewandte Chemie, International Edition, 46: 7778-7781.
Marked-up version of Figure 4 of U.S. Pat. No. 8,304,115 B1 presented in EPO opposition related to EP Patent No. 2976798.
Applicant's reply to EPO communication from the Examining Division dated Jan. 3, 2018 for EP Patent No. 2976798.
Hanc, et al., "On fabrication procedures of Li-ion conducting garnets," Journal of Solid State Chemistry 248, Jan. 2017, pp. 51-60.
Hitz, et al., "High-rate lithium cycling in a scalable trilayer Li-garnet-electrolyte architecture," Materials Today, vol. 22, Jan./Feb. 2019 (28 pages).
Hitz, et al., "High-rate lithium cycling in a scalable trilayer Li-garnet-electrolyte architecture," Materials Today, vol. 22, Jan./Feb. 2019, pp. 50-57.
Hotza, et al., "Tape casting of preceramic polymers toward advanced ceramics: A review," International Journal of Ceramic Engineering and Science, 2019, 1:21-41.
Jonson, et al., "Tape casting and sintering of $Li_7La_3Zr_{1.75}Nb_{0.25}Al_{0.1}O_{12}$ with $Li_3BO_3$ additions," Solid State Ionics, vol. 323, Oct. 1, 2018, pp. 49-55.
Liu, et al., "Multilayer Composite Solid Electrolytes for Lithium Ion Batteries," Syracuse University, Dissertations—All, Surface, May 2016 (172 pages).
Schnell, et al., "All-solid-state lithium-ion and lithium metal batteries— paving the way to large-scale production," Journal of Power Sources, vol. 382 (2018), pp. 160-175.
Official Communication from EPO Patent Application No. 14770567.7 dated Aug. 12, 2019.
Official Communication from EPO Patent Application No. 14770567.7 dated Apr. 20, 2018.
Extended Search Report and Opinion from EPO Patent Application No. 14770567.7 dated Sep. 26, 2016.
Office action from Japanese Patent Application No. 2016-504384 dated Feb. 13, 2019, and its English translation.
Office action from Japanese Patent Application No. 2016-504384 dated Mar. 28, 2019, and its English translation.
PCT International Preliminary Report on Patentability (Chapter I) with Written Opinion from PCT/US2014/031492 dated Sep. 22, 2015.
PCT International Search Report and Written Opinion from PCT/US2014/031492 dated Aug. 11, 2014.
Office action from Korean Patent Application No. 10-2015-7030408 dated Apr. 9, 2020 with its English translation.
From U.S. Appl. No. 14/222,306 (now published as U.S. Pat. No. 10,622,666), Notice of Allowance dated Dec. 2, 2019.
From U.S. Appl. No. 14/222,306 (now published as U.S. Pat. No. 10,622,666), Office Action dated Dec. 31, 2018.
From U.S. Appl. No. 14/222,306 (now published as U.S. Pat. No. 10,622,666), Office Action dated Feb. 14, 2018.
From U.S. Appl. No. 14/222,306 (now published as U.S. Pat. No. 10,622,666), Office Action dated Feb. 9, 2017.
From U.S. Appl. No. 14/222,306 (now published as U.S. Pat. No. 10,622,666), Office Action dated Apr. 25, 2016.
U.S. Appl. No. 16/847,582, filed Apr. 13, 2020, Wachsman.
Akridge, et al., "Performance of $Li/TiS_2$ solid state batteries using phosphorous chalcogenide network former glasses as solid electrolyte," Solid State Ionics, vols. 28-30, Part 1, Sep. 1988, pp. 841-846.
El kharbachi, et al. "Lithium ionic conduction in composites of $Li(BH_4)_{0.75}I_{0.25}$ and amorphous $0.75Li_2 \cdot S0.25P_2S_5$ for battery applications," Electrochimica Acta 278 (2018), pp. 332-339 wih Supplemental Information.
Shin, et al., "Comparative Study of $TiS_2$/Li-In All-Solid-State Lithium Batteries Using Glass-Ceramic $Li_3PS_4$ and $Li_{10}GeP_2S_{12}$ Solid Electrolytes," Electrochimica Acta, vol. 146 (2014), pp. 395-402.
Tatsumisago, et al., "Recent development of sulfide solid electrolytes and interfacial modification for all-solid-state rechargeable lithium batteries," Journal of Asian Ceramic Societies 1 (2013), pp. 17-25.
Unemoto, et al., "Stable Interface Formation between $TiS_2$ and $LiBH_4$ in Bulk-Type All- Solid-State Lithium Batteries," Chemistry of Materials, 2015, 27, pp. 5407-5416.
Wang, et al., "Mixed ionic-electronic conductor enabled effective cathode-electrolyte interface in all solid state batteries," Nano Energy 50 (2018), pp. 393-400.
West, et al., "Solid-State Sodium Batteries," Chapter 8, 1994, pp. 323-345.
Yao, et al, "All-solid-state lithium batteries with inorganic solid electrolytes: Review of fundamental science," Chin. Phys. B, vol. 25, No. 1 (2016) 018802 (14 pages).
Official Communication from EPO Patent Application No. 14770567.7 dated Jun. 25, 2020.
Opponent's reply to EPO dated Jun. 17, 2020 for EP Patent No. 2976798.
Applicant's reply to EPO dated Jan. 2, 2018 for EP Patent No. 2976798.
Curriculum vitae for Dr Christopher Lee.
Curriculum vitae for Dr Bahareh Yazdani.
Curriculum vitae for Dr Thomas Smith.
Mistler, Richard et al., "Tape Casting Theory and Practice" 735 Ceramic Place, Westerville, OH 43081, USA : The American Ceramic Society, 2000, Title and Contents Pages.
Mistler, Richard et al., "Tape Casting Theory and Practice" 735 Ceramic Place, Westerville, OH 43081, USA : The American Ceramic Society, 2000, Chapter 2.
Mistler, Richard et al., "Tape Casting Theory and Practice" 735 Ceramic Place, Westerville, OH 43081, USA : The American Ceramic Society, 2000, Chapter 3.
Mistler, Richard et al., "Tape Casting Theory and Practice" 735 Ceramic Place, Westerville, OH 43081, USA : The American Ceramic Society, 2000, pp. 152 to 185.
Mistler, Richard et al., "Tape Casting Theory and Practice" 735 Ceramic Place, Westerville, OH 43081, USA : The American Ceramic Society, 2000, pp. 204 to 208.
R9—Crucible Selection; Oxford Vacuum Scientific, www.oxford-vacuum.com, Internet Archive capture of May 29, 2012.
Fu, Kun (Kelvin) et al., "Three-dimensional bilayer garnet solid electrolyte based high energy density lithium metal-sulfur batteries" Energy and Environmental Science, 2017.
From U.S. Appl. No. 16/847,582, Office Action dated Sep. 21, 2021.
Aguesse, F.; Manalastas, W.; Buannic, L.; Del Amo, J. M. L.; Singh, G.; Llordés, A.; Kilner, J. Investigating the Dendritic Growth during Full Cell Cycling of Garnet Electrolyte in Direct Contact with Li Metal. ACS Appl. Mater. Interfaces 2017, 9 (4), 3808-3816.
Braga, M. H.; Grundish, N. S.; Murchison, A. J.; Goodenough, J. B. Alternative Strategy for a Safe Rechargeable Battery. Energy Environ. Sci. 2017, 10 (1), 331-336.
Cheng, X. B. et al. Recent Advances in Energy Chemistry between Solid-State Electrolyte and Safe Lithium-Metal Anodes. Chem. 2019, 5 (1), 74-96.
Cheng, X.-B. et al., Toward Safe Lithium Metal Anode in Rechargeable Batteries: AReview. Chem. Rev. 2017, 117 (15), 10403-10473.
Choi, J. W. et al., Promise and Reality of Post-Lithium-Ion Batteries with High Energy Densities. Nat. Rev. Mater. 2016, 1 (4), 16013.
Deng, T.; Ji, X.; Zhao, Y.; Cao, L.; Li, S.; Hwang, S.; Luo, C.; Wang, P.; Jia, H.; Fan, X.; et al. Tuning the Anode-Electrolyte Interface Chemistry for Garnet-Based Solid-State Li Metal Batteries. Adv. Mater. 2020, 32 (23), 2000030.
Duan, H.; Chen, W. P.; Fan, M.; Wang, W. P.; Yu, L.; Tan, S. J.; Chen, X.; Zhang, Q.; Xin, S.; Wan, L. J.; et al. Building an Air

(56) References Cited

OTHER PUBLICATIONS

Stable and Lithium Deposition Regulable Garnet Interface from Moderate-Temperature Conversion Chemistry. Angew. Chem., Int. Ed. 2020, 59 (29), 12069-12075.
Duan, H.; Fan, M.; Chen, W. P.; Li, J. Y.; Wang, P. F.; Wang, W. P.; Shi, J. L.; Yin, Y. X.; Wan, L. J.; Guo, Y. G. Extended Electrochemical Window of Solid Electrolytes via Heterogeneous Multilayered Structure for High-Voltage Lithium Metal Batteries. Adv. Mater. 2019, 31 (12), 1807789.
Duan, J.; Wu, W.; Nolan, A. M.; Wang, T.; Wen, J.; Hu, C.; Mo, Y.; Luo, W.; Huang, Y. Lithium-Graphite Paste: An Interface Compatible Anode for Solid-State Batteries. Adv. Mater. 2019, 31 (10), 1807243.
Fu ("Flexible, solid-state, ion-conducting membrane with 3D garnet nanofiber networks for lithium batteries") (Year: 2016).
Fu, K.; Gong, Y.; Xu, S.; Zhu, Y.; Li, Y.; Dai, J.; Wang, C.; Liu, B.; Pastel, G.; Xie, H.; et al. Stabilizing the Garnet Solid-Electrolyte/Polysulfide Interface in Li-S Batteries. Chem. Mater. 2017, 29 (19), 8037-8041.
Fu, Z.; Zhang, L.; Gritton, J. E.; Godbey, G.; Hamann, T.; Gong, Y.; McOwen, D.; Wachsman, E. Probing the Mechanical Properties of a Doped i7La3Zr2O12Garnet Thin Electrolyte for Solid-State Batteries. ACS Appl. Mater. Interfaces 2020, 12 (22), 24693-24700.
Hanifi et al. Porous electrolyte-supported tubular micro-SOFC design, Solid State Ionics vol. 192, pp. 368-371, Aug. 16, 2010.
Hua Xie, et al., "Amorphous-Carbon-Coated 3D Solid Electrolyte for an Electro-Chemomechanically Stable Lithium Metal Anode in Solid-State Batteries", Nano Lett. 2021, 21, pp. 6163-6170.
Huang, Y.; Chen, B.; Duan, J.; Yang, F.; Wang, T.; Wang, Z.; Yang, W.; Hu, C.; Luo, W.; Huang, Y. Graphitic Carbon Nitride (g-C3N4): An Interface Enabler for Solid-State Lithium Metal Batteries. Angew. Chem., Int. Ed. 2020, 59 (9), 3699-3704.
Huo, H.; Chen, Y.; Li, R.; Zhao, N.; Luo, J.; Pereira Da Silva, J. G.; Mucke, R.; Kaghazchi, P.; Guo, X.; Sun, X. Design of a Mixed Conductive Garnet/ Li Interface for Dendrite-Free Solid Lithium Metal Batteries. Energy Environ. Sci. 2020, 13 (1), 127-134.
International Search Report in the International Application No. PCT/US20019/018349, dated May 2, 2019.
Ji et al., Fabrication of low-temperature solid oxide fuel cells with a nonthin protective layer by atomic layer deposition, Nanoscale Research Letters, vol. 8, No. 48, pp. 1-7, Jan. 23, 2013.
Kato, Y.; Hori, S.; Saito, T.; Suzuki, K.; Hirayama, M.; Mitsui, A.; Yonemura, M.; Iba, H.; Kanno, R. High-Power All-Solid-State Batteries Using Sulfide Superionic Conductors. Nat. Energy 2016, 1 (4), 16030.
Kazyak, E.; Garcia-Mendez, R.; LePage, W. S.; Sharafi, A.; Davis, A. L.; Sanchez, A. J.; Chen, K. H.; Haslam, C.; Sakamoto, J.; Dasgupta, N. P. Li Penetration in Ceramic Solid Electrolytes: Operando Microscopy Analysis of Morphology, Propagation, and Reversibility. Matter 2020, 2 (4), 025-1048.
Krauskopf, T.; Dippel, R.; Hartmann, H.; Peppler, K.; Mogwitz, B.; Richter, F. H.; Zeier, W. G.; Janek, J. Lithium-Metal Growth Kinetics on LLZO Garnet-Type Solid Electrolytes. Joule 2019, 3 (8), 2030-2049.
Krauskopf, T.; Hartmann, H.; Zeier, W. G.; Janek, J. Toward a Fundamental Understanding of the Lithium Metal Anode in Solid-State Batteries—An Electrochemo-Mechanical Study on the Garnet-Type Solid Electrolyte Li 6.25 Al 0.25 La 3 Zr 2 O 12. ACS Appl. Mater. Interfaces 2019, 11 (15), 14463-14477.
Lin, D. et al., Reviving the Lithium Metal Anode for High-Energy Batteries. Nat. Nanotechnol. 2017, 12 (3), 194-206.
Liu, "Ionic Conductivity Enhancement of Polymer Electrolytes with Ceramic Nanowire Fillers" (Year: 2015).
Liu, Boyang et al., "3D lithium metal anodes hosted in asymmetric garnet frameworks toward high density batteries," Energy Storage Materials vol. 14, Sep. 2018, pp. 376-382, Available online Apr. 13, 2018.
Luo, W.; Gong, Y.; Zhu, Y.; Fu, K. K.; Dai, J.; Lacey, S. D.; Wang, C.; Liu, B.; Han, X.; Mo, Y.; et al. Transition from Superlithiophobicity to Superlithiophilicity of Garnet Solid-State Electrolyte. J. Am. Chem. Soc. 2016, 138 (37), 12258-12262.
McOwen, D. W.; Xu, S.; Gong, Y.; Wen, Y.; Godbey, G. L.; Gritton, J. E.; Hamann, T. R.; Dai, J.; Hitz, G. T.; Hu, L.; et al. 3D-Printing Electrolytes for Solid-State Batteries. Adv. Mater. 2018, 30 (18), 1707132.
McOwen, et al., "Understanding the Effect of Solid Electrolyte Structure on Properties through 3D Printing", ECS Meeting Abstracts, vol. MA2017-02, A06-Advanced Manufacturing Methods for Energy Storage Devices, vol. MA2017-02, Jan. 1, 2017, p. 586, XP055849276.
McOwen, et al., "3D Printing Microstructured Li-Garnet Electrolytes for Solid State Batteries", ECS Meeting Abstracts, vol. MA2016-02, 102-Solid State Ionic Devices 11, vol. MA2016-02, Jan. 1, 2016, p. 2996, XP055849269.
Pang, Q.; Shyamsunder, A.; Narayanan, B.; Kwok, C. Y.; Curtiss, L. A.; Nazar, L. F. Tuning the Electrolyte Network Structure to Invoke Quasi-Solid State Sulfur Conversion and Suppress Lithium Dendrite Formation in Li-S Batteries. Nat. Energy 2018, 3 (9), 783-791.
PCT International Search Report and Written Opinion from PCT/US2013/061660 dated Feb. 24, 2014.
PCT International Search Report and Written Opinion from PCT/US2015/057824 dated Jan. 19, 2016.
PCT International Search Report and Written Opinion from PCT/US2016/064232 dated Aug. 11, 2017.
PCT International Search Report and Written Opinion from PCT/US2017/030407 dated Jul. 7, 2017.
PCT International Search Report and Written Opinion from PCT/US2017/060421 dated May 7, 2019.
PCT International Search Report and Written Opinion from PCT/US2018/025289 dated Jul. 26, 2018.
PCT International Search Report and Written Opinion from PCT/US2019/018349 dated May 2, 2019.
Pfenninger, R.; Struzik, M.; Garbayo, I.; Stilp, E.; Rupp, J. L. M. A Low Ride on Processing Temperature for Fast Lithium Conduction in Garnet Solid-State Battery Films. Nat. Energy 2019, 4 (6), 475-483.
Presentation MIEC.
Ren, et al., "Garnet-type oxide electrolyte with novel porous-dense bilayer configuration for rechargeable all-solid-state lithium batteries", Ionics, Kiel, DE, vol. 23, No. 9, Jul. 15, 2017, pp. 2521-2527, XP036295599, ISSN: 0947-7047, DOI: 10.1007/ S11581-017-2224-5 Reported by EPO as retrieved on Jul. 15, 2017].
Sanghoon, Ji et al., "Fabrication of low-temperature solid oxide fuel cells with a nanothin protective layer by atomic layer deposition", Nanoscale Research Letter, vol. 8, Issue 48, pp. 1-7 Jan. 23, 2013.
Sun, et al., "3D Printing of Interdigitated Li-Ion Microbattery Architectures", Internet Citation, Jun. 17, 2013, pp. 4539-4543, XP002765684, Retrieved from the Internet:URL:http://onlinelibrary.wiley.com/doi/10.1002/adma.201301036/pclf [retrieved on Jan. 9, 2017].
Thangadurai, V.; Narayanan, S.; Pinzaru, D. Garnet-Type Solid-State Fast Li Ion Conductors for Li Batteries: Critical Review. Chem. Soc. Rev. 2014, 43 (13), 4714-4727.
Wang, C.; Fu, K.; Kammampata, S. P.; McOwen, D. W.; Samson, A. J.; Zhang, L.; Hitz, G. T.; Nolan, A. M.; Wachsman, E. D.; Mo, Y.; et al. Garnet-Type Solid-State Electrolytes: Materials, Interfaces, and Batteries. Chem. Rev. 2020, 120 (10), 4257-4300.
Wang, C.; Xie, H.; Zhang, L.; Gong, Y.; Pastel, G.; Dai, J.; Liu, B.; Wachsman, E. D.; Hu, L. Universal Soldering of Lithium and Sodium Alloys on Various Substrates for Batteries. Adv. Energy Mater. 2018, 8 (6), 1701963.
Wang, L.; Zhou, Z.; Yan, X.; Hou, F.; Wen, L.; Luo, W.; Liang, J.; Dou, S. X. Engineering of Lithium-Metal Anodes towards a Safe and Stable Battery. Energy Storage Mater. 2018, 14, 22-48.
Wood, K. N. et al., Lithium Metal Anodes: Toward an Improved Understanding of Coupled Morphological, Electrochemical, and Mechanical Behavior. ACS Energy Lett. 2017, 2 (3), 664-672.A157.
Written Opinion of the International Search Authority in the international application No. PCT/US2019/018349 dated May 2, 2019.
Xu, AS. et al., "Three-Dimensional, Solid-State Mixed Electron-Ion Conductive Framework for Lithium Metal Anode" Nano Letters 2018, 18, 6, 3926-3933, May 22, 2018.

(56) References Cited

OTHER PUBLICATIONS

Xu, W.; et al. Lithium Metal Anodes for Rechargeable Batteries. Energy Environ. Sci. 2014, 7 (2), 513-537.

Yang, C, et al., "Continuous plating/stripping behavior of solid-state lithium metal anode in a 3D ion-conductive framework," PNAS, Apr. 10, 2018, vol. 115, No. 15, pp. 3770-3775.

Zhang, Y. et al. Towards Better Li Metal Anodes: Challenges and Strategies. Mater. Today 2020, 33, 56-74.

Zhang, Y.; Meng, J.; Chen, K.; Wu, H.; Hu, J.; Li, C. Garnet-Based Solid-State Lithium Fluoride Conversion Batteries Benefiting from Eutectic Interlayer of Superior Wettability. ACS Energy Lett. 2020, 5 (4), 1167-1176.

Zhao, N.; Khokhar, W.; Bi, Z.; Shi, C.; Guo, X.; Fan, L. Z.; Nan, C. W. Solid Garnet Batteries. Joule 2019, 3 (5), 1190-1199.

Zhao, Q.; Stalin, S.; Zhao, C. Z.; Archer, L. A. Designing Solid-State Electrolytes for Safe, Energy-Dense Batteries. Nat. Rev. Mater. 2020, 5 (3), 229-252.

* cited by examiner

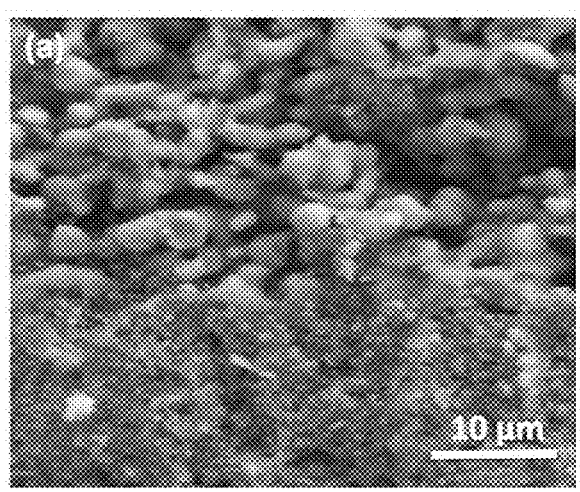
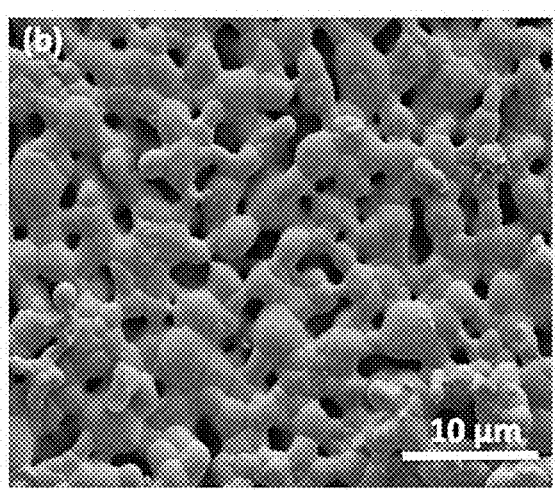
FIG. 8A　　　　　　　　　　　FIG. 8B
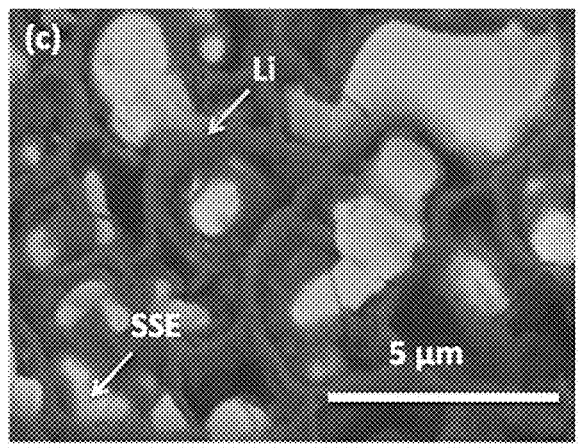
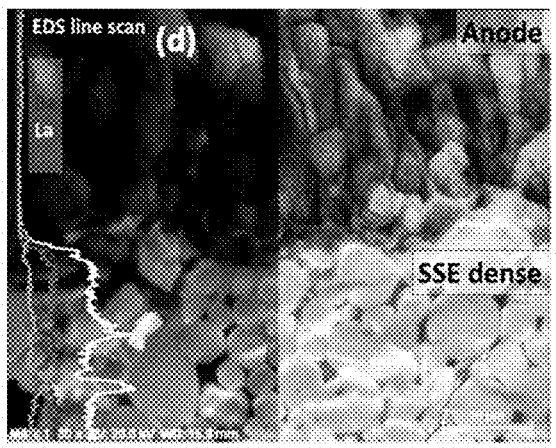
FIG. 8C　　　　　　　　　　　FIG. 8D

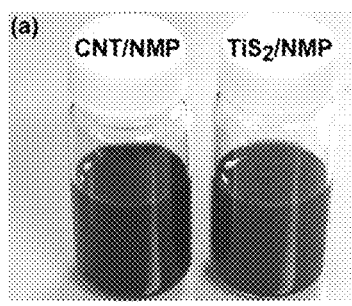
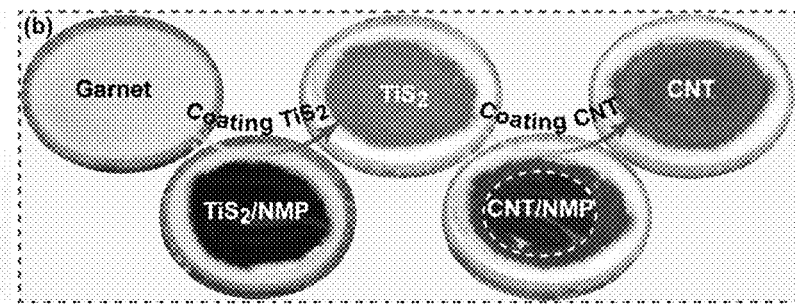
FIG. 10A   FIG. 10B
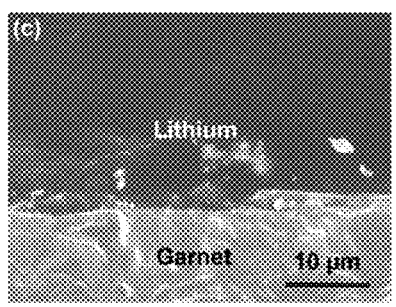
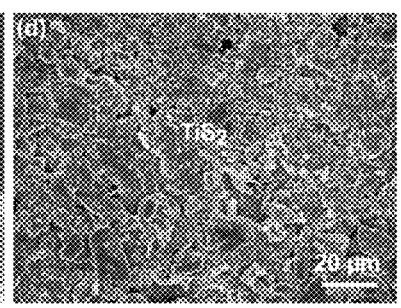
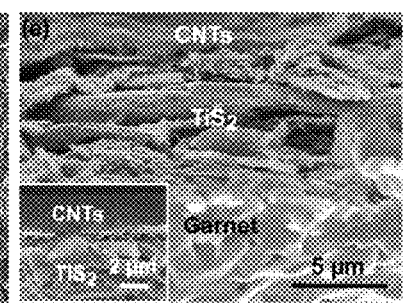
FIG. 10C   FIG. 10D   FIG. 10E
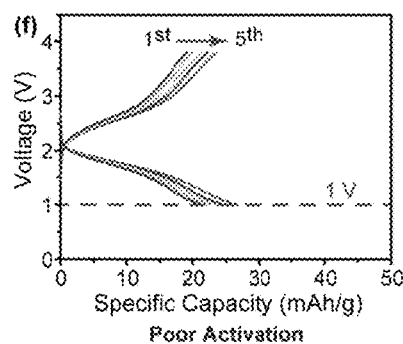
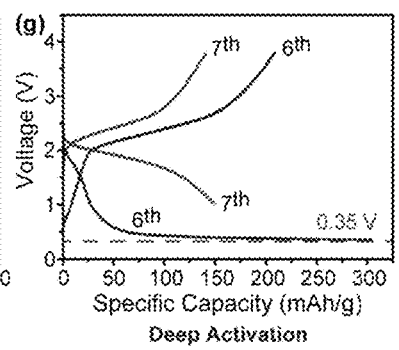
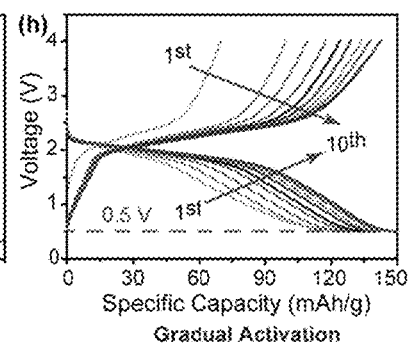
FIG. 10F   FIG. 10G   FIG. 10H

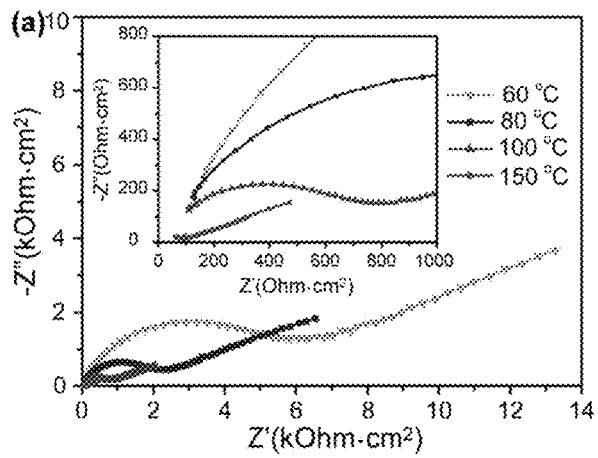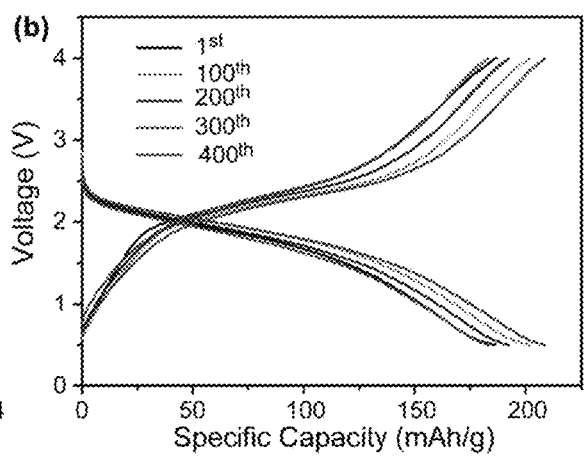
FIG. 12A  FIG. 12B
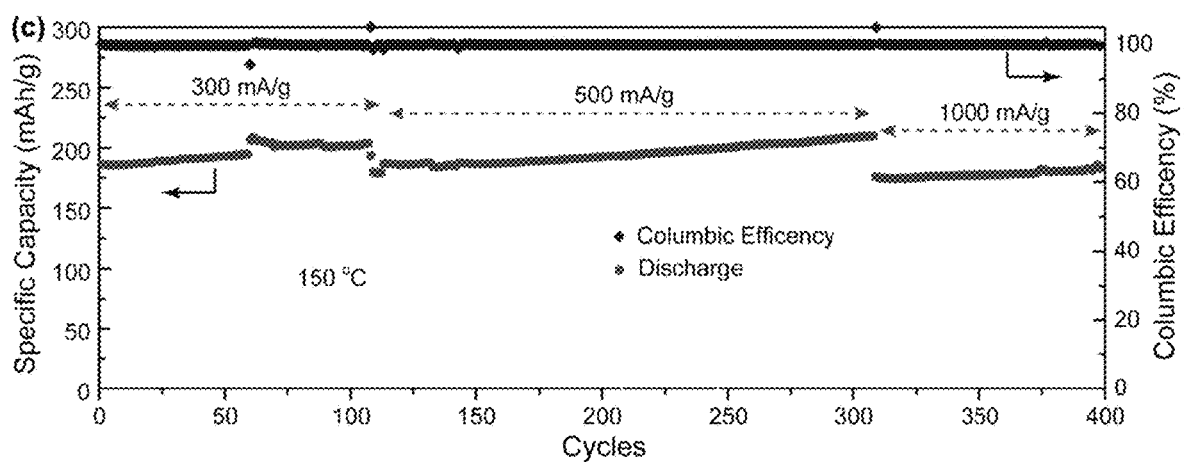
FIG. 12C
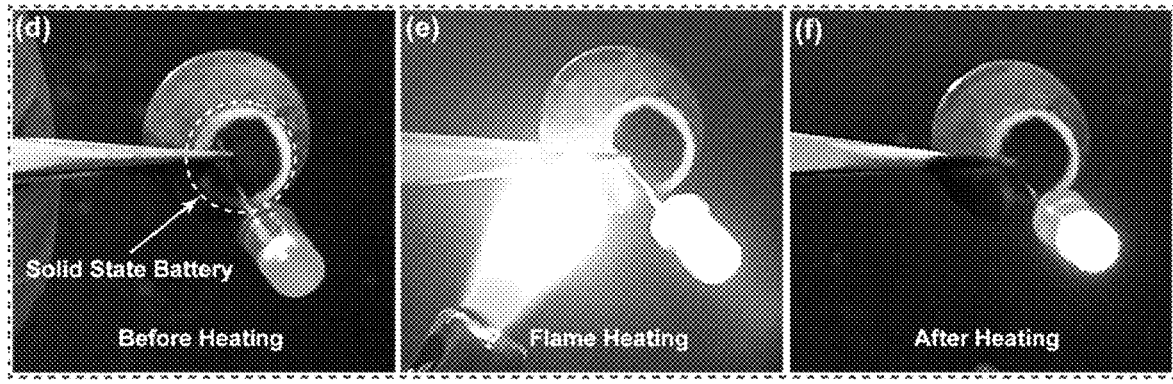
FIG. 12D  FIG. 12E  FIG. 12F

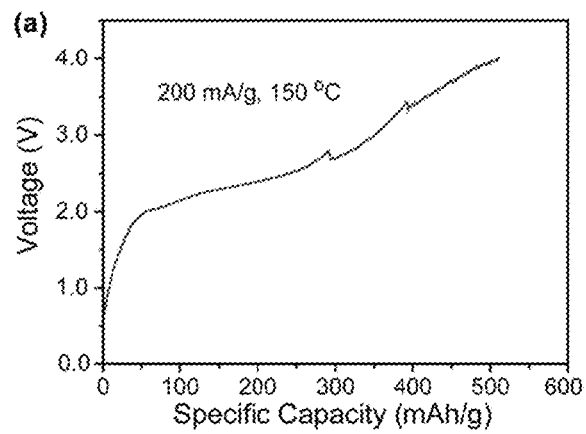
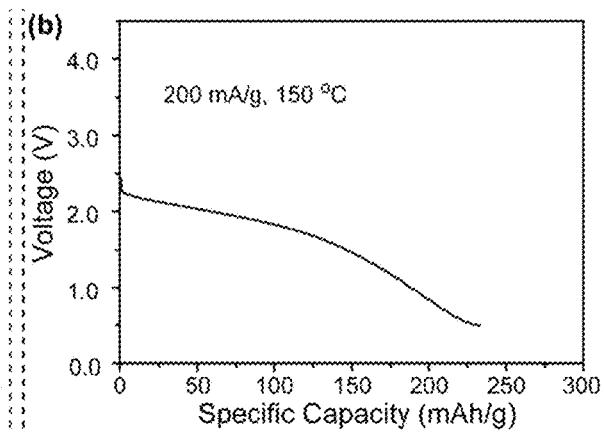
FIG. 13A
FIG. 13B
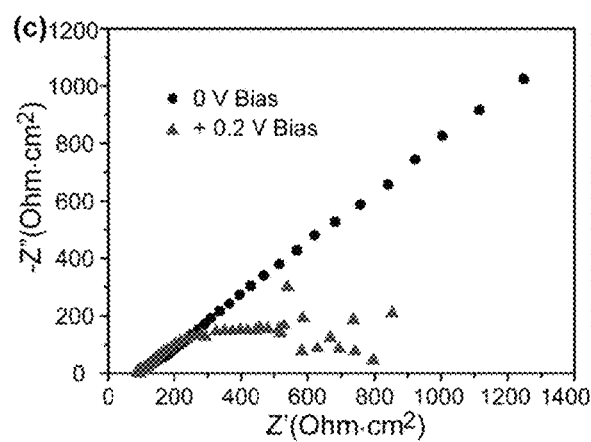
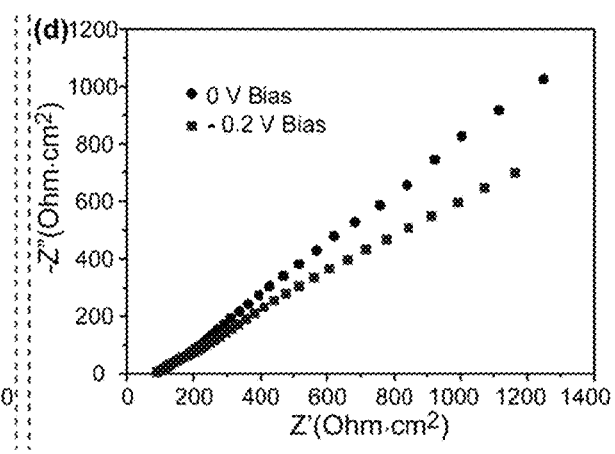
FIG. 13C
FIG. 13D
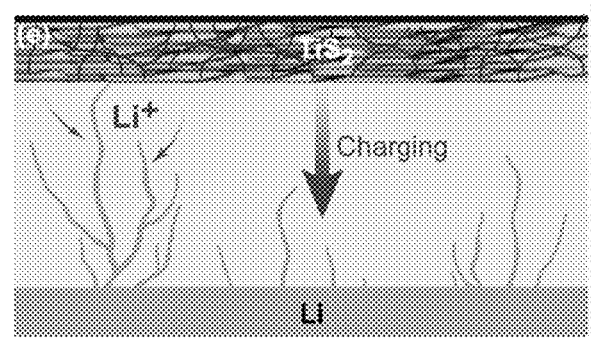
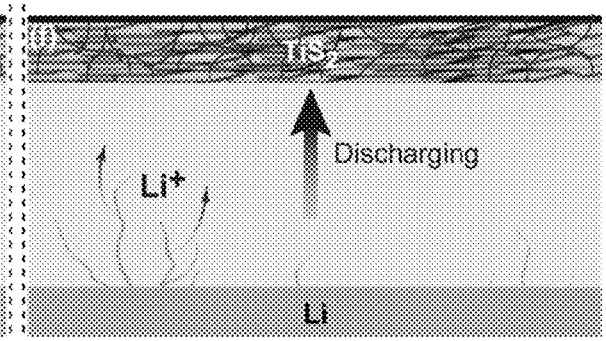
FIG. 13E
FIG. 13F

- Ionic liquid: 10μL/cm² (4ppm H₂O)
- Run @ RT, 60°C, 90°C
- Current density: C/10, C/5, C/2, 1C
- Potential window: 1.5-3V

SOLID STATE BATTERY SYSTEM USABLE AT HIGH TEMPERATURES AND METHODS OF USE AND MANUFACTURE THEREOF

CROSS-REFERENCE TO RELATED APPLICATIONS

This application is a continuation-in-part of U.S. patent application Ser. No. 16/847,582, filed on Apr. 13, 2020, which is a continuation-in-part of U.S. patent application Ser. No. 14/222,306, filed on Mar. 21, 2014, issued as U.S. Pat. No. 10,622,666 on Apr. 14, 2020, which claims the benefit of U.S. Provisional Patent Appl. No. 61/803,981, filed Mar. 21, 2013. This application claims the benefit of U.S. Provisional Patent Appl. No. 62/852,442, filed on May 24, 2019. Each of these documents is hereby incorporated by reference in its entirety.

STATEMENT REGARDING FEDERALLY SPONSORED RESEARCH

This invention was made with government support under contract no. DEAR0000384 under the ARPA-E Robust Affordable Next Generation Energy Storage Systems program, contract no. DEAR0000787 awarded under the ARPA-E Robust Affordable Next Generation Energy Storage Systems program, under contract no. NNC16CA03C awarded by NASA, and under contract no. DEEE0006860 by the U.S. Department of Energy. The government has certain rights in the invention.

FIELD OF THE DISCLOSURE

The present disclosure generally relates to ion conducting batteries with solid-state electrolytes.

BACKGROUND OF THE DISCLOSURE

Lithium ion batteries (LiBs) have the highest volumetric and gravimetric energy densities compared to all other rechargeable batteries making LiBs the prime candidate for a wide range of applications, from portable electronics to electric vehicles (EVs). Current LiBs are based mainly on $LiCoO_2$ or $LiFePO_4$ type positive electrodes, a $Li^+$ conducting organic electrolyte (e.g., $LiPF_6$ dissolved in ethylene carbonate-diethyl carbonate), and a Li metal or graphitic anode. Unfortunately, there are several technological problems that exist with current state-of-the art LiBs: safety due to combustible organic components; degradation due to the formation of reaction products at the anode and cathode electrolyte, interfaces (solid electrolyte interphase—SEI); and power/energy density limitations by poor electrochemical stability of the organic electrolyte. Other batteries based sodium, magnesium, and other ion conducting electrolytes have similar issues.

BRIEF SUMMARY OF THE DISCLOSURE

In a first aspect disclosed herein a battery cell is provided. The battery cell comprising: a solid-state electrolyte (SSE) comprising: a solid-state dense region having a porosity of less than 5%; and a solid-state first porous region having a porosity of 40% to 90%; a sulfide cathode contacting the SSE, wherein an anode material is disposed in pores of at least a portion of the first porous region.

In an embodiment of the first aspect, the anode material comprises lithium metal.

In an embodiment of the first aspect, the anode material is lithium.

In an embodiment of the first aspect, the anode material comprises sodium metal.

In an embodiment of the first aspect, the anode material is sodium metal.

In an embodiment of the first aspect, the pores contain melted anode material.

In an embodiment of the first aspect, the sulfide cathode comprises a cathode material selected from the group consisting of $TiS_2$, $MoS_2$, $WS_2$, Vanadium sulfides, $ZrS_2$, $NbS_2$, $TaS_2$ CuS, FeS, and NiS.

In an embodiment of the first aspect, the anode material is lithium and the sulfide cathode comprises a cathode material selected from the group consisting of $TiS_2$, $MoS_2$, $WS_2$, Vanadium sulfides, $ZrS_2$, $NbS_2$, $TaS_2$ CuS, FeS, and NiS.

In an embodiment of the first aspect, the anode material is lithium and the sulfide cathode comprises a cathode material that is $TiS_2$.

In an embodiment of the first aspect, the battery cell is operable up to 400° C.

In a second aspect, a method of operating a battery cell is provided. The method comprising discharging and charging the battery cell at a temperature up to 300° C., wherein battery cell comprising: a solid-state electrolyte (SSE) comprising: a solid-state dense region having a porosity of less than 5%; and a solid-state first porous region having a porosity of 40% to 90%; a sulfide cathode contacting the SSE, wherein an anode material is disposed in pores of at least a portion of the first porous region.

In a third aspect, a battery cell is provided. The battery cell comprising: lithium garnet solid-state electrolyte (SSE); an anode comprising a lithium metal anode material, the anode in contact with the lithium-garnet SSE; a cathode comprising a cathode material that is a metal sulfide or an olivine, the cathode in contact with the lithium-garnet SSE.

In an embodiment of the third aspect, the SSE comprises pores with the pores containing lithium metal anode material in the melted state.

In an embodiment of the third aspect, the cathode material is the metal sulfide, and the cathode comprises a second cathode material that is sulfur, and the sulfur is present as particles within the metal sulfide.

In an embodiment of the third aspect, the battery cell is operable for charging and discharging at 150° C.

In an embodiment of the third aspect, the cathode material is the metal sulfide, and the metal sulfide is a lithiated and/or non-lithiated form of a material selected from the group consisting of $TiS_2$, $MoS_2$, $WS_2$, Vanadium sulfides, $ZrS_2$, $NbS_2$, $TaS_2$ CuS, FeS, and NiS.

In an embodiment of the third aspect, the cathode material si the metal sulfide, and the metal sulfide is lithiated and/or non-lithiated $TiS_2$.

In an embodiment of the third aspect, the cathode is the metal sulfide, and the cathode further comprises carbon nanotubes located on a surface of the metal sulfide.

In an embodiment of the third aspect, the cathode further comprises an electrically conductive carbon located on a surface of the metal sulfide.

In an embodiment of the third aspect, the battery cell is operable from 60 to 150° C. to charge and discharge the battery.

In a fourth aspect, a method of operating a battery cell is provided. The method comprising: discharging and charging the battery cell at a temperature of 80-150° C. or at a temperature of 100-150° C., wherein the battery cell comprises: lithium garnet solid-state electrolyte (SSE); an anode comprising a lithium metal anode material, the anode in contact with the lithium-garnet SSE; a cathode comprising a cathode material that is a metal sulfide, the cathode in contact with the lithium-garnet SSE.

In a fifth aspect, a method of operating a battery cell is provided. The method comprising: discharging and charging the battery cell at a temperature of 150° C., wherein the battery cell comprises: lithium garnet solid-state electrolyte (SSE); an anode comprising a lithium metal anode material, the anode in contact with the lithium-garnet SSE; a cathode comprising a cathode material that is a metal sulfide, the cathode in contact with the lithium-garnet SSE.

In a sixth aspect, a method of operating a battery cell is provided. The method comprising: discharging the battery cell during or after contact with a flame, wherein the battery cell comprises: lithium garnet solid-state electrolyte (SSE); an anode comprising a lithium metal anode material, the anode in contact with the lithium-garnet SSE; a cathode comprising a cathode material that is a metal sulfide, the cathode in contact with the lithium-garnet SSE.

BRIEF DESCRIPTION OF THE FIGURES

The following figures are given by way of illustration only, and thus are not intended to limit the scope of the present disclosure.

FIG. 8A-D. (a) Cross section and (b) top view of an example of a SSE with porous scaffold, in which anode and cathode materials will be filled. (c) Cross-section of SSE scaffold after Li metal infiltration. (d) Cross section at Li-metal-dense SSE interface. Images demonstrate excellent Li wetting of SSE was obtained.

FIG. 10A-H. Fabrication and Characterization of LGTS all solid state batteries. (a) Photographs of the CNT and $TiS_2$ solutions dispersed in NMP solvent. (b) The solution process to coat the $TiS_2$ cathode and CNTs on the garnet surface. (c) Cross-sectional SEM image of the Li-garnet interface, with conformal contact of Li on the garnet surface. (d) SEM image of the sonicated $TiS_2$ flakes. (e) Cross-sectional SEM image of the 2 μm CNT current collector film on the $TiS_2$ cathode. Voltage profiles of the LGTS batteries cycled at 100° C. (f) between 1 and 4 V, (g) with deep discharge activation to 0.35 V at a current density of 20 mA/g, and (h) between 0.5 and 4 V at a current density of 50 mA/g.

FIG. 12A-F. Electrochemical performance of the LGTS batteries at high temperatures up to 150° C. (a) EIS spectra of the LGTS batteries between 60° C. and 150° C. The inset shows the zoomed-in, low resistance spectra. (b) Voltage profiles and (c) the corresponding cycling performance of the LGTS batteries cycled under 300, 500, and 100 mA/g, respectively. (d-f) Results from the flame test of a LGTS battery while powering a LED. After direct exposure to the flame, the apparent performance of the LGTS battery improves.

FIG. 13A-F. Characterization of the LGTS batteries after observed short-circuits. The unstable voltage profiles while charging (a), and stable voltage profiles while discharging (b) indicate an asymmetrical short-circuit. (c, d) EIS spectra measured under a charged state of 2 V with positive and negative bias voltages, respectively. (e, f) Schematic of the dynamic short-circuit evolution during the charge and discharge processes, respectively. Li deposition on the Li metal anode leads to the dynamic short-circuit, while the stripping of Li during discharge temporarily heals the short-circuit.

DETAILED DESCRIPTION OF THE DISCLOSURE

Figure 1:
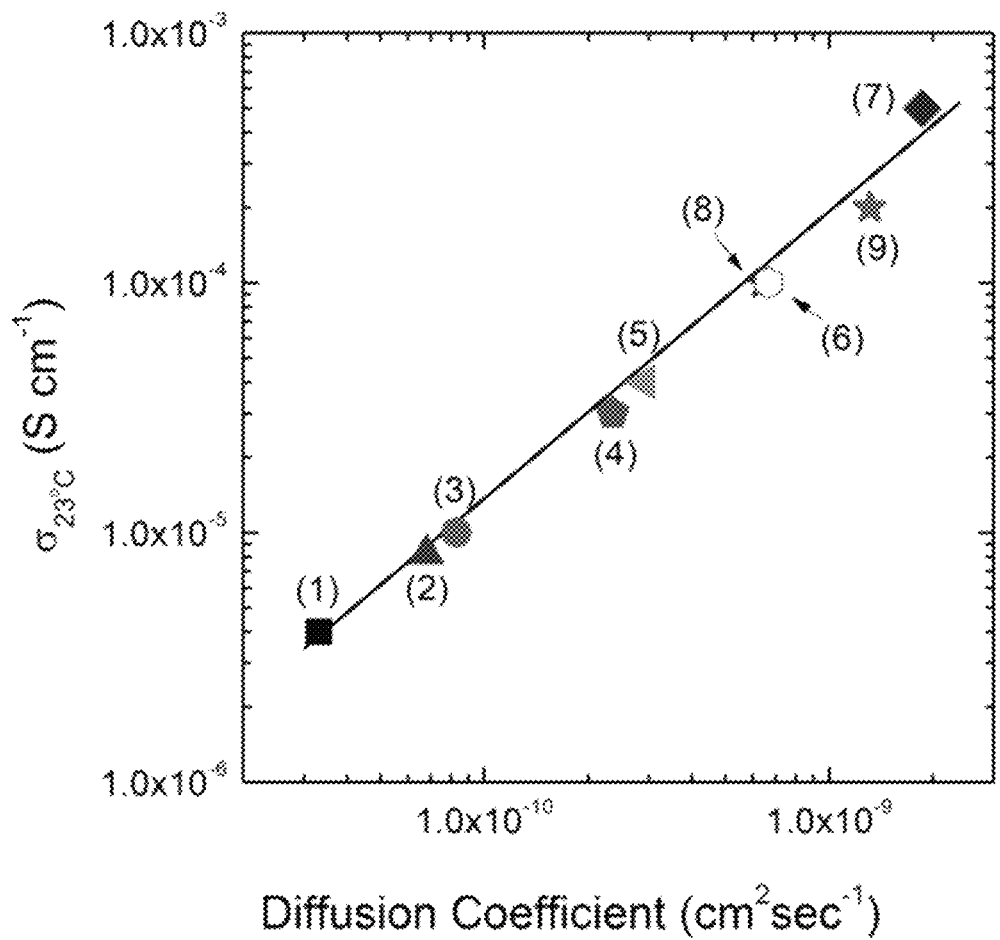
FIG. 1. Ionic conductivity vs. diffusion coefficient of garnet-type compounds: (1) $Li_5La_3Ta_2O_{12}$, (2) $Li_5La_3Sb_2O_{12}$, (3) $Li_5La_3Nb_2O_{12}$, (4) $Li_{5.5}BaLa_2Ta_2O_{11.75}$, (5) $Li_6La_2BaTaO_{12}$, (6) $Li_{6.5}BaLa_2Ta_2O_{12.25}$, (7) $Li_7La_3Zr_2O_{12}$, (8) $Li_{6.5}La_{2.5}Ba_{0.5}TaZrO_{12}$ (sintered at 900° C.), and (9) $Li_{6.5}La_{2.5}Ba_{0.5}TaZrO_{12}$ (sintered at 1100° C.).

The present disclosure provides ion conducting batteries having a solid state electrolyte. For example, the batteries are lithium-ion, solid-state electrolyte batteries, sodium-ion, solid-state electrolyte batteries, or magnesium-ion solid-state electrolyte batteries. Lithium-ion ($Li^+$) batteries are used, for example, in portable electronics and electric cars, sodium-ion ($Na^+$) batteries are used, for example, for electric grid storage to enable intermittent renewable energy deployment such as solar and wind, and magnesium-ion ($Mg^{2+}$) batteries are expected to have higher performance than $Li^+$ and $Na^+$ because $Mg^{2+}$ carries twice the charge for each ion.

The solid-state batteries have advantages over previous batteries. For example, the solid electrolyte is non-flammable providing enhanced safety, and also provides greater stability to allow high voltage electrodes for greater energy density. The battery design (FIG. 3) provides additional advantages in that it allows for a thin electrolyte layer and a larger electrolyte/electrode interfacial area, both resulting in lower resistance and thus greater power and energy density. In addition, the structure eliminates mechanical stress from ion intercalation during charging and discharging cycles and the formation of solid electrolyte interphase (SEI) layers, thus removing the capacity fade degradation mechanisms that limit lifetime of current battery technology.

The solid state batteries comprise a cathode material, an anode material, and an ion-conducting, solid-state electrolyte material. The solid-state electrolyte material has a dense region (e.g. a layer) and one or two porous regions (layers). The porous region(s) can be disposed on one side of the dense region or disposed on opposite sides of the dense region. The dense region and porous region(s) are fabricated from the same solid-state electrolyte material. The batteries conduct ions such as, for example, lithium ions, sodium ions, or magnesium ions.

The cathode comprises cathode material in electrical contact with the porous region of the ion-conducting, solid-state electrolyte material. For example, the cathode material is an ion-conducting material that stores ions by mechanisms such as intercalation or reacts with the ion to form a secondary phase (e.g., an air or sulfide electrode). Examples of suitable cathode materials are known in the art.

The cathode material, if present, is disposed on at least a portion of a surface (e.g., a pore surface of one of the pores) of a porous region of the ion-conducting, solid-state electrolyte material. The cathode material, when present, at least partially fills one or more pores (e.g., a majority of the pores) of a porous region or one of the porous regions of the ion-conducting, solid-state electrolyte material. In an embodiment, the cathode material is infiltrated into at least a portion of the pores of the porous region of the ion-conducting, solid-state electrolyte material.

In an embodiment, the cathode material is disposed on at least a portion of the pore surface of the cathode side of the porous region of the ion-conducting, SSE material, where the cathode side of the porous region of ion-conducting, SSE material is opposed to an anode side of the porous region of ion-conducting, SSE material on which the anode material is disposed.

In an embodiment, the cathode material is a lithium ion-conducting material. For example, the lithium ion-conducting cathode material is, lithium nickel manganese cobalt oxides (NMC, $LiNi_xMn_yCo_zO_2$, where $x+y+z=1$), such as $LiCoO_2$, $LiNi_{1/3}Co_{1/3}Mn_{1/3}O_2$, $LiNi_{0.5}Co_{0.2}Mn_{0.3}O_2$, lithium manganese oxides (LMOs), such as $LiMn_2O_4$, $LiNi_{0.5}Mn_{1.5}O_4$, lithium iron phosphates (LFPs) such as $LiFePO_4$, olivine cathode materials (which includes materials such as $LiFePO_4$, $LiMnPO_4$, $LiNiPO_4$, $LiCoPO_4$ and the like) and $Li_2MMn_3O_8$, where M is selected from Fe, Co, and combinations thereof. In an embodiment, the ion-conducting cathode material is a high energy ion-conducting cathode material such as $Li_2MMn_3O_8$, wherein M is selected from Fe, Co, and combinations thereof.

In an embodiment, the cathode material is a sodium ion-conducting material. For example, the sodium ion-conducting cathode material is $Na_2V_2O_5$, $P2-Na_{2/3}Fe_{1/2}Mn_{1/2}O_2$, $Na_3V_2(PO_4)_3$, $NaMn_{1/3}Co_{1/3}Ni_{1/3}PO_4$ and composite materials (e.g., composites with carbon black) thereof such as $Na_{2/3}Fe_{1/2}Mn_{1/2}O_2$@graphene composite.

In an embodiment, the cathode material is a magnesium ion-conducting material. For example, the magnesium ion-conducting cathode material is doped manganese oxide (e.g., $Mg_xMnO_2\cdot yH2O$).

In an embodiment, the cathode material is an organic sulfide or polysulfide. Examples of organic sulfides include carbynepolysulfide and copolymerized sulfur.

In an embodiment, the cathode material is an air electrode. Examples of materials suitable for air electrodes include those used in solid-state lithium ion batteries with air cathodes such as large surface area carbon particles (e.g., Super P which is a conductive carbon black) and catalyst particles (e.g., alpha-$Mno_2$ nanorods) bound in a mesh (e.g., a polymer binder such as PVDF binder).

It may be desirable to use an electrically conductive material as part of the ion-conducting cathode material. In an embodiment, the ion-conducting cathode material also comprises an electrically conducting carbon material (e.g., graphene or carbon black), and the ion-conducting cathode material, optionally, further comprises a organic or gel ion-conducting electrolyte. (In general, where carbon materials such as carbon nanotubes, carbon black, graphene are described or used throughout this disclosure, and where electrical conductivity is beneficial, other electrically conductive carbon materials can also be used, such as elemental carbon materials or others described herein.) The electrically conductive material may separate from the ion-conducting cathode material. For example, electrically conductive material (e.g., graphene) is disposed on at least a portion of a surface (e.g., a pore surface) of the porous region of the ion-conducting, SSE electrolyte material and the ion-conducting cathode material is disposed on at least a portion of the electrically conductive material (e.g., graphene).

The anode comprises anode material in electrical contact with the porous region of the ion-conducting, SSE material. For example, the anode material is the metallic form of the ion conducted in the solid state electrolyte (e.g., metallic lithium for a lithium-ion battery) or a compound that intercalates the conducting ion (e.g., lithium carbide, $Li_6C$, for a lithium-ion battery). Examples of suitable anode materials are known in the art.

The anode material, if present, is disposed on at least a portion of a surface (e.g., a pore surface of one of the pores) of the porous region of the ion-conducting, SSE material. The anode material, when present, at least partially fills one or more pores (e.g., a majority of the pores) of the porous region of ion-conducting, SSE electrolyte material. In an embodiment, the anode material is infiltrated into at least a portion of the pores of the porous region of the ion-conducting, solid-state electrolyte material.

In an embodiment, the anode material is disposed on at least a portion of the pore surface of an anode-side porous region of the ion-conducting, SSE electrolyte material, where the anode side of the ion-conducting, solid-state electrolyte material is opposed to a cathode side of the porous, ion-conducting, SSE on which the cathode material is disposed.

In an embodiment, the anode material is a lithium-containing material. For example, the anode material is lithium metal, or an ion-conducting lithium-containing anode material such as lithium titanates (LTOs) such as $Li_4Ti_5O_{12}$.

In an embodiment, the anode material is a sodium-containing material. For example, the anode material is sodium metal, or an ion-conducting sodium-containing anode material such as $Na_2C_8H_4O_4$ and $Na_{0.66}Li_{0.22}Ti_{0.78}O_2$.

In an embodiment, the anode material is a magnesium-containing material. For example, the anode material is magnesium metal.

In an embodiment, the anode material is a conducting material such as graphite, hard carbon, porous hollow carbon spheres and tubes, and tin and its alloys, tin/carbon, tin/cobalt alloy, or silicon/carbon.

The ion-conducting, solid-state electrolyte material has a dense regions (e.g., a dense layer) and one or two porous regions (e.g., porous layer(s)). The porosity of the dense region is less than that of the porous region(s). In an embodiment, the dense region is not porous. The cathode material and/or anode material is disposed on a porous region of the SSE material forming a discrete cathode material containing region and/or a discrete anode material containing region of the ion-conducting, solid-state electrolyte material. For example, each of these regions of the ion-conducting, solid-state electrolyte material has, independently, a dimension (e.g., a thickness perpendicular to the longest dimension of the material) of 20 μm to 200 μm, including all integer micron values and ranges therebetween.

The dense regions and porous regions described herein can be discrete dense layers and discrete porous layers. Accordingly, in an embodiment, the ion-conducting, solid-state electrolyte material has a dense layer and one or two porous layers.

The ion-conducting, solid-state electrolyte material conducts ions (e.g., lithium ions, sodium ions, or magnesium ions) between the anode and cathode. The ion-conducting, solid-state electrolyte material is free of pin-hole defects. The ion-conducting solid-state electrolyte material for the battery or battery cell has a dense region (e.g., a dense layer) that is supported by one or more porous regions (e.g., porous layer(s)) (the porous region(s)/layer(s) are also referred to herein as a scaffold structure(s)) comprised of the same ion-conducting, solid-state electrolyte material.

In an embodiment, the ion-conducting solid state electrolyte has a dense region (e.g., a dense layer) and two porous regions (e.g., porous layers), where the porous regions are disposed on opposite sides of the dense region and cathode material is disposed in one of the porous regions and the anode material in the other porous region.

In an embodiment, the ion-conducting solid state electrolyte has a dense region (e.g., a dense layer) and one porous region (e.g., porous layer), where the porous regions are disposed on one sides of the dense region and either cathode material or anode material is disposed in the porous region. If cathode material is disposed in the porous region, a conventional battery anode (e.g., a conventional solid-state battery anode) is formed on the opposite side of the dense region by known methods. If anode material is disposed in the porous region, a conventional battery cathode (e.g., a conventional solid-state battery cathode) is formed on the opposite side of the dense region.

The porous region (e.g., porous layer) of the ion-conducting, solid-state electrolyte material has a porous structure. The porous structure has microstructural features (e.g., microporosity) and/or nanostructural features (e.g., nanoporosity). For example, each porous region, independently, has a porosity of 10% to 90%, including all integer % values and ranges therebetween. In another example, each porous region, independently, has a porosity of 30% to 70%, including all integer % values and ranges therebetween. Where two porous regions are present the porosity of the two layers may be the same or different. The porosity of the individual regions can be selected to, for example, accommodate processing steps (e.g., higher porosity is easier to fill with electrode material (e.g., charge storage material) (e.g., cathode)) in subsequent screen-printing or infiltration step, and achieve a desired electrode material capacity, i.e., how much of the conducting material (e.g., Li, Na, Mg) is stored in the electrode materials. The porous region (e.g., layer) provide structural support to the dense layer so that the thickness of the dense layer can be reduced, thus reducing its resistance. The porous layer also extends ion conduction of the dense phase (solid electrolyte) into the electrode layer to reduce electrode resistance both in terms of ion conduction through electrode and interfacial resistance due to charge transfer reaction at electrode/electrolyte interface, the later improved by having more electrode/electrolyte interfacial area.

In an embodiment, the solid-state, ion-conducting electrolyte material is a solid-state electrolyte, lithium-containing material. For example, the solid-state electrolyte, lithium-containing material is a lithium-garnet SSE material.

In an embodiment, the solid-state, ion-conducting electrolyte material is a Li-garnet SSE material comprising cation-doped $Li_5La_3M'_2O_{12}$, cation-doped $Li_6La_2BaTa_2O_{12}$, cation-doped $Li_7La_3Zr_2O_{12}$, and cation-doped $Li_6BaY_2M'_2O_{12}$. The cation dopants are barium, yttrium, zinc, or combinations thereof and M' is Nb, Zr, Ta, or combinations thereof.

In an embodiment, the Li-garnet SSE material comprises $Li_5La_3Nb_2O_{12}$, $Li_5La_3Ta_2O_{12}$, $Li_7La_3Zr_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zr_2O_{12}$, $Li_{6.4}Y_3Zr_{1.4}Ta_{0.6}O_{12}$, $Li_{6.5}La_{2.5}Ba_{0.5}TaZrO_{12}$, $Li_6BaY_2M'_2O_{12}$, $Li_7Y_3Zr_2O_{12}$, $Li_{6.75}BaLa_2Nb_{1.75}Zn_{0.25}O_{12}$, or $Li_{6.75}BaLa_2Ta_{1.75}Zn_{0.25}O_{12}$.

In an embodiment, the, solid-state, ion-conducting electrolyte material sodium-containing, solid-state electrolyte, material. For example, the sodium-containing, solid-state electrolyte is $Na_3Zr_2Si_2PO_{12}$ (NASICON) or beta-alumina.

In an embodiment, the, solid-state, ion-conducting electrolyte material is a, solid-state electrolyte, magnesium-containing material. For example, the magnesium ion-conducting electrolyte material is $MgZr_4P_6O_{24}$.

The ion-conducting, solid-state electrolyte material has a dense region that free of the cathode material and anode material. For example, this region has a dimension (e.g., a thickness perpendicular to the longest dimension of the material) of 1 μm to 100 μm, including all integer micron values and ranges therebetween. In another example, this region has a dimension of 5 μm to 40 μm.

In an embodiment, the solid state battery comprises a lithium-containing cathode material and/or a lithium-containing anode material, and a lithium-containing, ion-conducting, solid-state electrolyte material. In an embodiment, the solid state battery comprises a sodium-containing cathode material and/or a sodium-containing anode material, and a sodium-containing, ion-conducting, solid-state electrolyte material. In an embodiment, the solid state battery comprises a magnesium-containing cathode material and/or a magnesium-containing anode material, and a magnesium-containing, ion-conducting, solid-state electrolyte material.

The solid-state, ion-conducting electrolyte material is configured such that ions (e.g., lithium ions, sodium ions, or magnesium ions) diffuse into and out of the porous region(s) (e.g., porous layer(s)) of the solid-state, ion-conducting electrolyte material during charging and/or discharging of the battery. In an embodiment, the solid-state, ion-conducting battery comprises a solid-state, ion-conducting electrolyte material comprising one or two porous regions (e.g., porous layer(s)) configured such that ions (e.g., lithium ions, sodium ions, or magnesium ions) diffuse into and out of the porous region(s) of solid-state, ion-conducting electrolyte material during charging and/or discharging of the battery.

One of ordinary skill in the art would understand that a number of processing methods are known for processing/forming the porous, solid-state, ion-conducting electrolyte material such as high temperature solid-state reaction processes, co-precipitation processes, hydrothermal processes, sol-gel processes.

The material can be systematically synthesized by solid-state mixing techniques. For example, a mixture of starting materials may be mixed in an organic solvent (e.g., ethanol or methanol) and the mixture of starting materials dried to evolve the organic solvent. The mixture of starting materials may be ball milled. The ball milled mixture may be calcined. For example, the ball milled mixture is calcined at a temperature between 500° C. and 2000° C., including all integer ° C. values and ranges therebetween, for least 30 minutes to at least 50 hours. The calcined mixture may be milled with media such as stabilized-zirconia or alumina or another media known to one of ordinary skill in the art to achieve the prerequisite particle size distribution. The calcined mixture may be sintered. For example, the calcined mixture is sintered at a temperature between 500° C. and 2000° C., including all integer ° C. values and ranges therebetween, for at least 30 minutes to at least 50 hours. To achieve the prerequisite particle size distribution, the calcined mixture may be milled using a technique such as vibratory milling, attrition milling, jet milling, ball milling, or another technique known to one of ordinary skill in the art, using media such as stabilized-zirconia, alumina, or another media known to one of ordinary skill in the art.

One of ordinary skill in the art would understand that a number of conventional fabrication processing methods are known for processing the ion-conducting SSE materials such as those set forth above in a green-form. Such methods include, but are not limited to, tape casting, calendaring, embossing, punching, laser-cutting, solvent bonding, lamination, heat lamination, extrusion, co-extrusion, centrifugal casting, slip casting, gel casting, die casting, pressing, isostatic pressing, hot isostatic pressing, uniaxial pressing, and sol gel processing. The resulting green-form material may then be sintered to form the ion-conducting SSE materials using a technique known to one of ordinary skill in the art, such as conventional thermal processing in air, or controlled atmospheres to minimize loss of individual components of the ion-conducting SSE materials. In some embodiments of the present invention it is advantageous to fabricate ion-conducting SSE materials in a green-form by die-pressing, optionally followed by isostatic pressing. In other embodiments it is advantageous to fabricate ion-conducting SSE materials as a multi-channel device in a green-form using a combination of techniques such as tape casting, punching, laser-cutting, solvent bonding, heat lamination, or other techniques known to one of ordinary skill in the art.

Standard x-ray diffraction analysis techniques may be performed to identify the crystal structure and phase purity of the solid sodium electrolytes in the sintered ceramic membrane.

The solid state batteries (e.g., lithium-ion solid state electrolyte batteries, sodium-ion solid state electrolyte batteries, or magnesium-ion solid state electrolyte batteries) comprise current collector(s). The batteries have a cathode-side (first) current collector disposed on the cathode-side of the porous, solid-state electrolyte material and an anode-side (second) current collector disposed on the anode-side of the porous, solid-state electrolyte material. The current collector are each independently fabricated of a metal (e.g., aluminum, copper, or titanium) or metal alloy (aluminum alloy, copper alloy, or titanium alloy).

The solid-state batteries (e.g., lithium-ion solid state electrolyte batteries, sodium-ion solid state electrolyte batteries, or magnesium-ion solid state electrolyte batteries) may comprise various additional structural components (such as bipolar plates, external packaging, and electrical contacts/leads to connect wires. In an embodiment, the battery further comprises bipolar plates. In an embodiment, the battery further comprises bipolar plates and external packaging, and electrical contacts/leads to connect wires. In an embodiment, repeat battery cell units are separated by a bipolar plate.

The cathode material (if present), the anode material (if present), the SSE material, the cathode-side (first) current collector (if present), and the anode-side (second) current collector (if present) may form a cell. In this case, the solid-state, ion-conducting battery comprises a plurality of cells separated by one or more bipolar plates. The number of cells in the battery is determined by the performance requirements (e.g., voltage output) of the battery and is limited only by fabrication constraints. For example, the solid-state, ion-conducting battery comprises 1 to 500 cells, including all integer number of cells and ranges therebetween.

In an embodiment, the ion-conducting, solid-state battery or battery cell has one planar cathode and/or anode-electrolyte interface or no planar cathode and/or anode-electrolyte interfaces. In an embodiment, the battery or battery cell does not exhibit solid electrolyte interphase (SEI).

The following examples are presented to illustrate the present disclosure. They are not intended to limiting in any manner.

Example 1

The following is an example describing the solid-state lithium ion batteries of the present disclosure and making same.

The flammable organic electrolytes of conventional batteries can be replaced with non-flammable ceramic-based solid-state electrolytes (SSEs) that exhibit, for example, room temperature ionic conductivity of $\geq 10^{-3}$ Scm$^{-1}$ and electrochemical stability up to 6V. This can further allow replacement of typical LiCoO$_2$ cathodes with higher voltage cathode materials to increase power/energy densities. Moreover, the integration of these ceramic electrolytes in a planar stacked structure with metal current collectors will provide battery strength.

Intrinsically safe, robust, low-cost, high-energy-density all-solid-state Li-ion batteries (SSLiBs), can be fabricated by integrating high conductivity garnet-type solid Li ion electrolytes and high voltage cathodes in tailored micro/ nano-structures, fabricated by low-cost supported thin-film ceramic techniques. Such batteries can be used in electric vehicles.

Li-garnet solid-state electrolytes (SSEs) that have, for example, a room temperature (RT) conductivity of ~$10^{-3}$ Scm$^{-1}$ (comparable to organic electrolytes) can be used. The can be increased to ~$10^{-2}$ Scm$^{-1}$ by increasing the disorder of the Li-sublattice. The highly stable garnet SSE allows use of Li$_2$MMn$_3$O$_8$ (M=Fe, Co) high voltage (~6V) cathodes and Li metal anodes without stability or flammability concerns.

Known fabrication techniques can be used to form electrode supported thin-film (~10 μm) SSEs, resulting in an area specific resistance (ASR) of only ~0.01 Ωcm$^{-2}$. Use of scalable multilayer ceramic fabrication techniques, without need for dry rooms or vacuum equipment, provide dramatically reduced manufacturing cost.

Moreover, the tailored micro/nanostructured electrode support (scaffold) will increase interfacial area, overcoming the high impedance typical of planar geometry solid-state lithium ion batteries (SSLiBs), resulting in a C/3 IR drop of only 5.02 mV. In addition, charge/discharge of the Li-anode and Li$_2$Mn$_3$O$_8$ cathode scaffolds by pore-filling provides high depth of discharge ability without mechanical cycling fatigue seen with typical electrodes.

At ~170 μm/repeat unit, a 300V battery pack would only be <1 cm thick. This form factor with high strength due to Al bipolar plates allows synergistic placement between framing elements, reducing effective weight and volume. Based on the SSLiB rational design, targeted SSE conductivity, high voltage cathode, and high capacity electrodes the expected effective specific energy, including structural bipolar plate, is ~600 Wh/kg at C/3. Since bipolar plates provide strength and no temperature control is necessary this is essentially a full battery pack specification other than the external can. The corresponding effective energy density is 1810 Wh/L.

All the fabrication processes can be done with conventional ceramic processing equipment in ambient air without the need of dry rooms, vacuum deposition, or glove boxes, dramatically reducing cost of manufacturing.

For the all solid-state battery with no SEI or other performance degradation mechanisms inherent in current state-of-art Li-batteries, the calendar life of the instant battery is expected to exceed 10 years and cycle life is expected to exceed 5000 cycles.

Solid-state Li-garnet electrolytes (SSEs) have unique properties for SSLiBs, including room temperature (RT) conductivity of ~$10^{-3}$ Scm$^{-1}$ (comparable to organic electrolytes) and stability to high voltage (~6V) cathodes and Li-metal anodes without flammability concerns.

Use of SSE oxide powders can enable use of low-cost scalable multilayer ceramic fabrication techniques to form electrode supported thin-film (~10 μm) SSEs without need for dry rooms or vacuum equipment, as well as engineered micro/nano-structured electrode supports to dramatically increase interfacial area. The later will overcome the high interfacial impedance typical of planar geometry SSLiBs, provide high depth of discharge ability without mechanical cycling fatigue seen with typical electrodes, as well as avoid SEI layer formation.

The SSE scaffold/electrolyte/scaffold structure will also provide mechanical strength, allowing for the integration of structural metal interconnects (bipolar plates) between planar cells, to improve strength, weight, thermal uniformity, and form factor. The resulting strength and form factor provides potential for the battery pack to be load bearing.

Highly Li$^+$ conducting and high voltage stable garnet type solid electrolytes can be made by doping specific cations for Ta and Zr in Li$_5$La$_3$Ta$_2$O$_{12}$, Li$_6$La$_2$BaTa$_2$O$_{12}$ and Li$_7$La$_3$Zr$_2$O$_{12}$, to extend RT conductivity from ~$10^{-3}$ to ~$10^{-2}$ Scm$^{-1}$. Compositions having desirable conductivity, ionic transference number, and electrochemical stability up to 6V against elemental Li can be determined.

Electrode supported thin film SSEs can be fabricated. Submicron SSE powders and SSE ink/paste formulations thereof can be made. Tape casting, colloidal deposition, and sintering conditions can be developed to prepare dense thin-film (~10 μm) garnet SSEs on porous scaffolds.

Cathode and anode can be integrated. Electrode-SSE interface structure and SSE surface can be optimized to minimize interfacial impedance for targeted electrode compositions. High voltage cathode inks can be made to fabricate SSLiBs with high voltage cathode and Li-metal anode incorporated into the SSE scaffold. The SSLiB electrochemical performance can be determined by measurements including CV, energy/power density and cycling performance.

Stacked multi-cell SSLiBs with Al/Cu bipolar plates can be assembled. Energy/power density, cycle life, and mechanical strength as a function of layer thicknesses and area for the stacked multi-cell SSLiBs can be determined.

Li-Stuffed Garnets SSEs. Conductivity of Li-Garnet SSEs can be improved doping to increase the Li content ("stuffing") of the garnet structure. Li-stuffed garnets exhibit desirable physical and chemical properties for SSEs including:

RT bulk conductivity (~$10^{-3}$ S/cm) for cubic Li$_7$La$_3$Zr$_2$O$_{12}$.

High electrochemical stability for high voltage cathodes (up to 6 V), about 2 V higher than current organic electrolytes and about 1 V higher than the more popular LiPON.

Excellent chemical stability in contact with elemental and molten Li anodes up to 400° C.

Li$^+$ transference number close to the maximum of 1.00, which is important to battery cycle efficiency, while typical polymer electrolytes are only ~0.35.

Wide operating temperature capability, electrical conductivity that increases with increasing temperature reaching 0.1 Scm$^{-1}$ at 300° C., and maintains appreciable conductivity below 0° C. In contrast, polymer electrolytes are flammable at high temperature Synthesizable as simple mixed oxide powders in air, hence easy scale up for bulk synthesis.

Figure 2A:
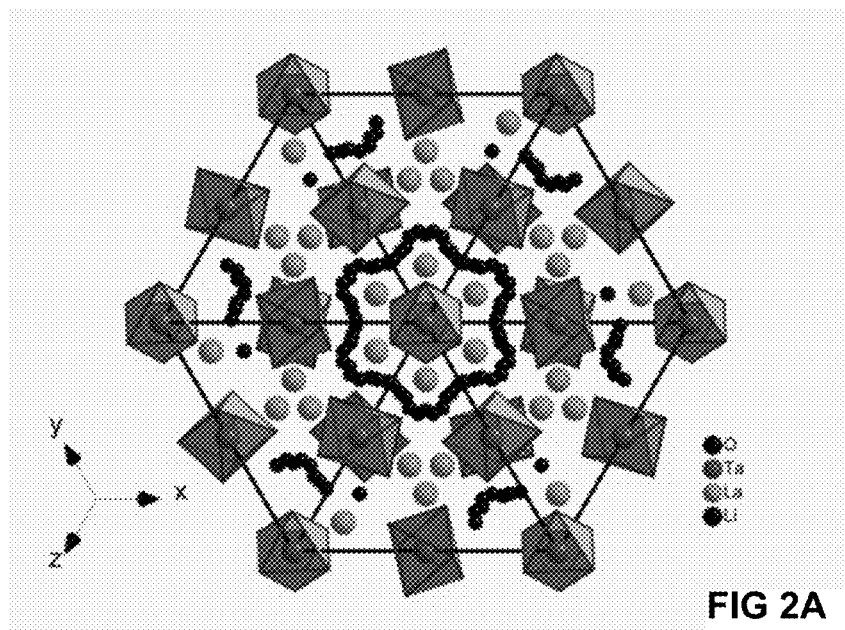
FIGS. 2A-C. Example of optimization of Li ion conduction in garnet-type solid state electrolytes (SSEs): (a) and (b) path of $Li^+$ conduction and (c) effect of $Li^+$ site occupancy on conductivity.

Li$^+$ conductivity of garnet SSEs can be further increased. The Li ion conductivity of garnet is highly correlated to the concentration of Li$^+$ in the crystal structure. FIG. 1 shows the relationship between the Li$^+$ conductivity and diffusion coefficient for various Li-stuffed garnets. The conductivity increases with Li content, for example, the cubic Li$_7$-phase (Li$_7$La$_3$Zr$_2$O$_{12}$) exhibits a RT conductivity of 5×10-4 S/cm. However, conductivity also depends on synthesis conditions, including sintering temperature. The effects of composition and synthesis method can be determined to achieve a minimum RT conductivity of ~$10^{-3}$ S/cm for the scaffold supported SSE layer. It is expected the RT conductivity can be increased to ~$10^{-2}$ S/cm through doping to increase the disorder of the Li sub lattice. Ionic conduction in the garnet structure occurs around the metal-oxygen octahedron, and site occupancy of Li ions in tetrahedral vs. octahedral sites directly controls the Li ion conductivity (FIG. 2). For example, in Li$_5$La$_3$Ta$_2$O$_{12}$, about 80% of Li ions occupy the tetrahedral sites while only 20% occupy octahedral sites.

Figure 2B:
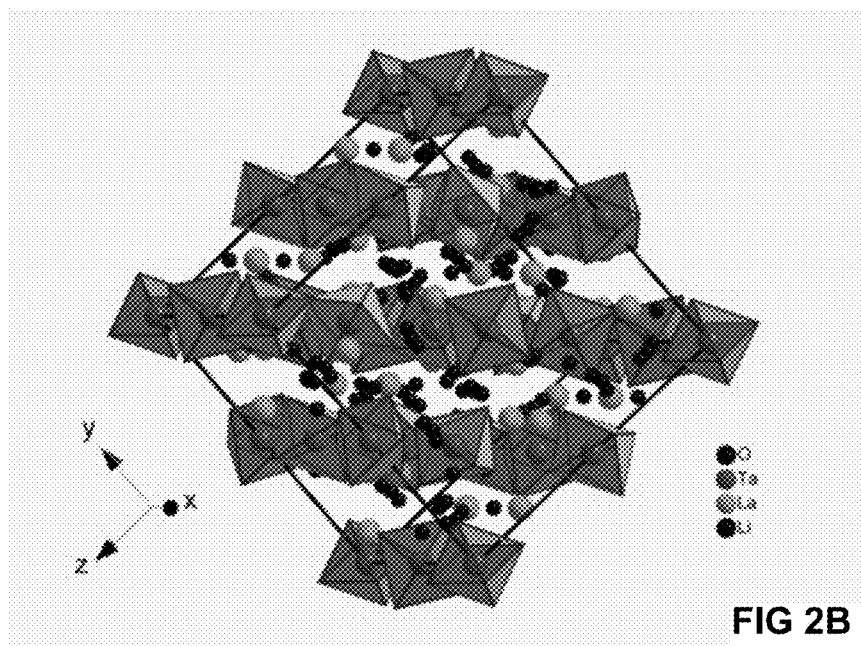
Figure 2C:
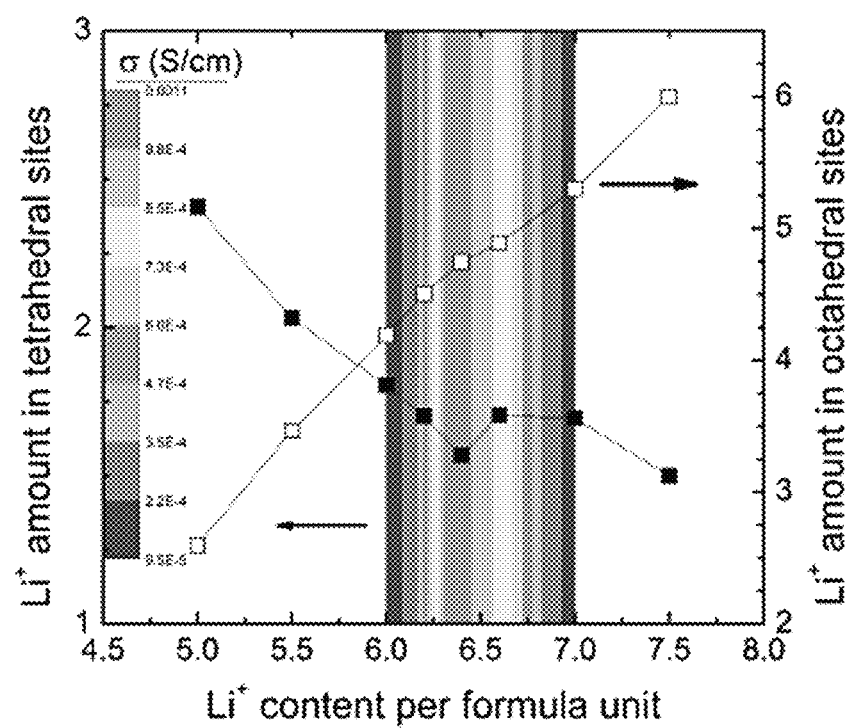

Increasing the Li$^+$ concentration at octahedral sites while decreasing occupancy of the tetrahedral sides has been shown to result in an order of magnitude increase in ionic conductivity (FIG. 2B). Smaller-radii metal ions (e.g., Y$^{3+}$), which are chemically stable in contact with elemental Li and isovalent with La, can be doped to develop a new series of garnets: Li$_6$BaY$_2$M$_2$O$_{12}$, Li$_{6.4}$Y$_3$Zr$_{1.6}$Ta$_{0.6}$O$_{12}$, Li$_7$Y$_3$Zr$_2$O$_{12}$, and their solid solutions; to increase ionic conductivity. The enthalpy of formation of Y$_2$O$_3$ (−1932 kJ/mol) is lower than that of La$_2$O$_3$ (−1794 kJ/mol), hence, doping Y for La will increase Y—O bond strength and weaken Li—O bonds. Thus increasing Li$^+$ mobility due to weaker lithium to oxygen interaction energy. Further, it is expected that Y will provide a smoother path for ionic conduction around the metal oxygen octahedral due to its smaller ionic radius (FIG. 2A).

In another approach, we can substitute M$^{2+}$ cations (e.g., Zn$^{2+}$, a 3d$^0$ cation known to form distorted metal-oxygen octandera) for the M$^{5+}$ sites in Li$_6$BaY$_2$M$_2$O$_{12}$. ZnO is expected to play a dual role of both further increasing the concentration of mobile Li ions in the structure and decreasing the final sintering temperature. Each M$^{2+}$ will add three more Li$^+$ for charge balance and these ions will occupy vacant Li$^+$ sites in the garnet structure. Thus, further increase Li$^+$ conduction can be obtained by modifying the garnet composition to control the crystal structure, Li-site occupancy, and minimize the conduction path activation energy.

Due to the ceramic powder nature of Li-garnets, SSLiBs can be fabricated using conventional fabrication techniques. This has tremendous advantages in terms of both cost and performance. All the fabrication processes can be done with conventional ceramic processing equipment in ambient air without the need of dry rooms, vacuum deposition, or glove boxes, dramatically reducing cost of manufacturing.

Figure 3:
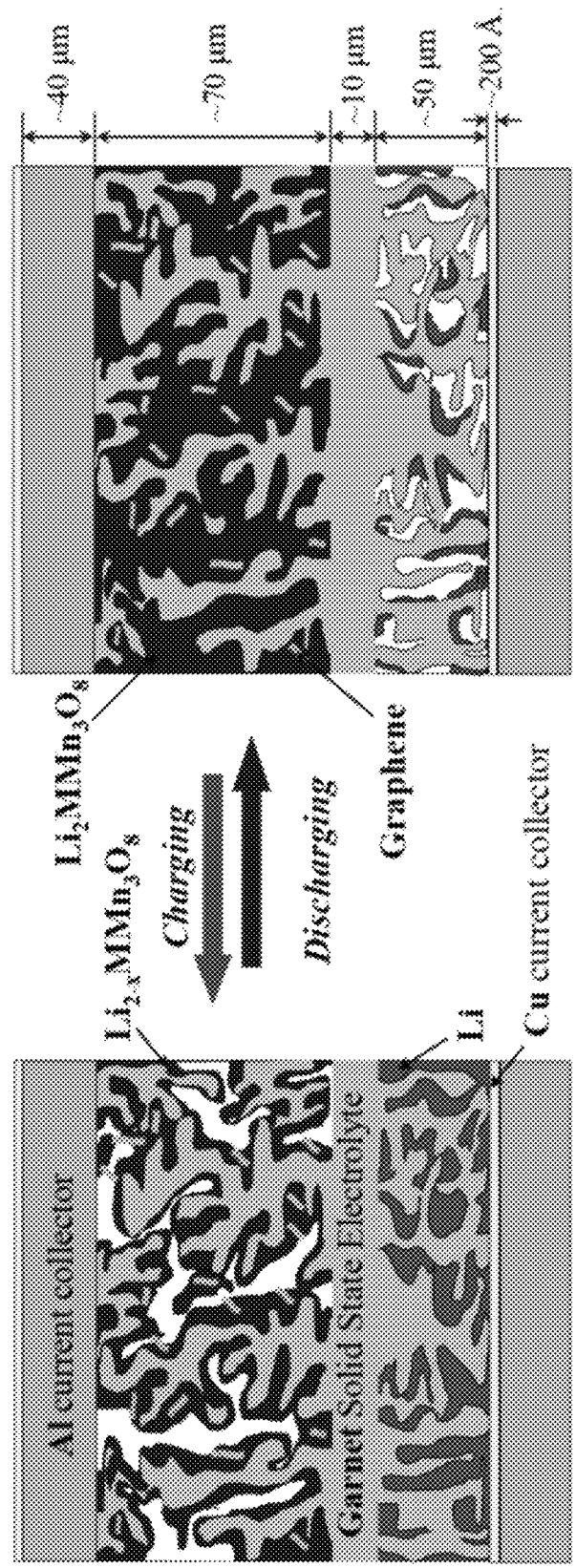
FIG. 3. Schematic of an example of the solid-state lithium battery (SSLiB) showing thin (~10 μm) garnet SSE layer extending as a tailored nano/microstructured scaffold into (Li metal filled) anode and ($Li_2MMn_3O_8$, M=Fe, Co, mixed with graphene) cathode to provide structural support for solid-state electrolyte (SSE) layer, and high surface area and continuous ion transport path for reduced polarization. The multi-purpose ~40 μm Al current collector (with ~200 Å Cu on anode side) provides strength and thermal and electrical conduction. The ~170 μm repeat units are stacked in series to provide desired battery pack voltage and strength (300V pack would be <1 cm thick). Highly porous SSE scaffold creates large interface area significantly decreasing cell impedance.

The SSLiBs investigated to date suffer from high interfacial impedance due to their low surface area, planar electrode/electrolyte interfaces (e.g., LiPON based SSLiBs). Low area specific resistance (ASR) cathodes and anodes can be achieved by integration of electronic and ionic conducting phases to increase electrolyte/electrode interfacial area and extend the electrochemically active region farther from the electrolyte/electrode planar interface. It is expected that modification of the nano/microstructure of the electrolyte/electrode interface (for example, by colloidal deposition of powders or salt solution impregnation) can reduce overall cell area specific resistance (ASR), resulting in an increase in power density relative to identical composition and layer thickness cells. These same advances can be applied to decrease SSLiB interfacial impedance. The SSLiB will be made by known fabrication techniques Low-cost, high-speed, scalable multi-layer ceramic processing can be used to fabricate supported thin-film (~10 μm) SSEs on tailored nano/micro-structured electrode scaffolds. ~50 and 70 μm tailored porosity (nano/micro features) SSE garnet support layers (scaffolds) can be tape cast, followed by colloidal deposition of a ~10 μm dense garnet SSE layer and sintering. The resulting pinhole-free SSE layer is expected to be mechanically robust due to support layers and have a low area specific resistance ASR, for example, only ~0.01 Ω Cm$^{-2}$. Li$_2$MMn$_3$O$_8$ will be screen printed into the porous cathode scaffold and initial Li-metal will be impregnated in the porous anode scaffold (FIG. 3). For example, Li$_2$(Co, Fe)Mn$_3$O$_8$ high voltage cathodes can be prepared in the form of nano-sized powders using wet chemical methods. The nano-sized electrode powders can be mixed with conductive materials such as graphene or carbon black and polymer binder in NMP solvent. Typical mass ratio for cathode, conductive additive or binder is 85%:10%:5% by weight. The slurry viscosity can be optimized for filling the porous SSE scaffold, infiltrated in and dried. An Li-metal flashing of Li nanoparticles may be infiltrated in the porous anode scaffold or the Li can be provided fully from the cathode composition so dry room processing can be avoided.

Another major advantage of this structure is that charge/discharge cycles will involve filling/emptying of the SSE scaffold pores (see FIG. 3), rather than intercalating and expanding carbon anode powders/fibers. As a result there will be no change in electrode dimensions between charged and discharged state. This is expected to remove both cycle fatigue and limitations on depth of discharge, the former allowing for greater cycle life and the later for greater actual battery capacity.

Moreover, there will be no change in overall cell dimensions allowing for the batteries to be stacked as a structural unit. Light-weight, ~40 micron thick Al plates will serve not only as current collectors but also provide mechanical strength. ~20 nm of Cu can be electrodeposited on the anode side for electrochemical compatibility with Li. The bipolar current collector plates can be applied before the slurry is fully dried and pressed to improve the electrical contact between bipolar current collector and the electrode materials.

Compared to current LiBs with organic electrolytes, the SSLiB with intrinsically safe solid state chemistry is expected to not only increase the specific energy density and decrease the cost on the cell level, but also avoid demanding packing level and system level engineering requirements. High specific energy density at both cell and system level can be achieved, relative to the state-of-the-art, by the following:

Stable electrochemical voltage window of garnet SSE allows for high voltage cathodes resulting in high cell voltage (~6 V).

Porous SSE scaffold allows use of high specific capacity Li-metal anode.

Porous 3-dimensionally networked SSE scaffolds allows electrode materials to fill volume with a smaller charge transfer resistance, increasing mass percentage of active electrode materials.

Bipolar plates will be made by electroplating ~200 Å Cu on ~40 μm Al plates. Given the 3× lower density of Al vs. Cu the resulting plate will have same weight as the sum of the ~10 μm Al and Cu foils used in conventional batteries. However, with 3× the strength (due to ~9× higher strength-to-weight ratio of Al vs. Cu).

The repeat unit (SSLiB/bipolar plate) will then be stacked in series to obtain desired battery pack voltage (e.g., fifty 6V SSLiBs for a 300V battery pac would be <1 cm thick).

Thermal and electrical control/management systems are not needed as there is no thermal runaway concern.

The proposed intrinsically safe SSLiBs also drastically reduces mechanical protection needs.

The energy density is calculated from component thicknesses of device structure (FIG. 4) normalized to 1 cm$^2$ area (see data in Table 1). The estimated SSE scaffold porosity is 70% for the cathode and 30% for the anode. The charge/capacity is balanced for the anode and cathode by: $m_{Li} \times C_{Li} = m_{LMFO} \times C_{LMFO}$ where LFMO stands for Li$_2$FeMn$_3$O$_8$. Therefore, the total mass (cathode-scaffold/SSE/scaffold and bipolar plate) is calculated to be 50.92 mg per cm$^2$ area. Note it is our intent to fabricate charged cells with all Li in cathode to avoid necessity of dry room. Thus, anode-scaffold would be empty of Li metal for energy density calculations.

TABLE 1

Material parameters for energy density calculation.

| Material | Density (g/cm3) | mass per cm2 (mg) | Capacity (mA/g) | Voltage (Vs. Li) (V) |
|---|---|---|---|---|
| Cathode LFMO | 3.59 | 17.00 | 300 | 6 |
| Anode Li | 0.54 | 0 | 3800 | 0 |
| SSE | 5.00 | 27.5 | N/A | N/A |
| Al | 2.70 | 5.40 | N/A | N/A |
| Cu | 8.69 | 0.02 | N/A | N/A |
| Carbon additive | 1.00 | 1.00 | N/A | N/A |
| Cell Total | | 50.92 | | |

The corresponding total energy is $E_{tot}$=C×V=5.13 mAh×6 V=30.78 mWh. The total volume is $1.7 \times 10^{-5}$ L for 1 cm$^2$ area. Therefore, the theoretical effective specific energy, including structural bipolar plate, is 603.29 Wh/kg. As calculated below, the overpotential at C/3 is negligible compared with the cell voltage, leading to an energy density at this rate close to theoretical. Since the bipolar plate provides strength and no temperature control is necessary this is essential the full battery pack specification other than external can. (In contrast, state-of-art LiBs have a ~40% decrease in energy density from cell level to pack level.) The corresponding effective energy density of the complete battery pack is ~1810 Wh/L.

A desirable rate performance is expected with the SSLiBs due to 3-dimensional (3D) networked scaffold structures, comparable to organic electrolyte based ones, and much better than traditional planar solid state batteries. The reasons for this include the following:

Porous SSE scaffolds provide extended 3D electrode-electrolyte interface, dramatically increasing the surface contact area and decreasing the charge-transfer impedance.

Use of SSE having a conductivity of $10^{-3}$-$10^{-2}$ S/cm in electrode scaffolds to provide continuous Li$^+$ conductive path.

Use of high aspect ratio (lateral dimension vs. thickness) graphene in electrode pores to provide continuous electron conductive path.

To calculate the rate performance, the overpotential of SSLiB, shown in FIG. 3, was estimated, including electrolyte impedance ($Z_{SSE}$) and electrode-electrolyte-interface impedance ($Z_{interface}$).

The porous SSE scaffold achieves a smaller interfacial impedance by: $1/Z_{interface}$=S*Gs, where S is the interfacial area close to the porous SSE and Gs is the interfacial conductance per specific area. The interfacial impedance is expected to be small since the porous SSE results in a large electrode-electrolyte interfacial area. For ion transport impedance through the entire SSE structure: ZSSE=Zcathode-scaffold+Zdense-SSE+Zanode-scaffold; and Z=(ρL)/(A*(1−ε)), where p=100 Ωcm, L is thickness (FIG. 3), A is 1 cm$^2$, and ε is porosity (70% for the cathode scaffold, 50% for the anode scaffold and 0% for the dense SSE layer). Therefore, Zcathode-scaffold=2.3 Ohm/cm$^2$, Zdense-SSE=0.01 Ohm/cm$^2$, and Zanode-scaffold=1 Ohm/cm$^2$; resulting in Ztotal=3.31 Ohm/cm$^2$. At C/3, the current density=1.71 mA/cm$^2$ and the voltage drop is 5.02 mV/cm$^2$, which is negligible compared with a 6 V cell voltage.

Desirable cycling performance is expected due to the following advantages:

No structural challenges associated with intercalating and de-intercalating Li due to filling of 3D porous structure.

Excellent mechanical and electrochemical electrolyte-electrode interface stability due to 3D porous SSE structure.

No SEI formation inherent in current state-of-art LiBs, which consumes electrolyte and increase cell impedance.

NoLi dendrite formation (problematic for LiBs with Li anodes) due to dense ceramic SSE.

Therefore, the calendar life should easily exceed 10 years and the cycle life should easily exceed 5000 cycles.

The SSLiB is an advancement in battery materials and architecture. It can provide the necessary transformational change in battery performance and cost to accelerate vehicle electrification. As a result it can improve vehicle energy efficiency, reduce energy related emissions, and reduce energy imports.

Figure 4A:
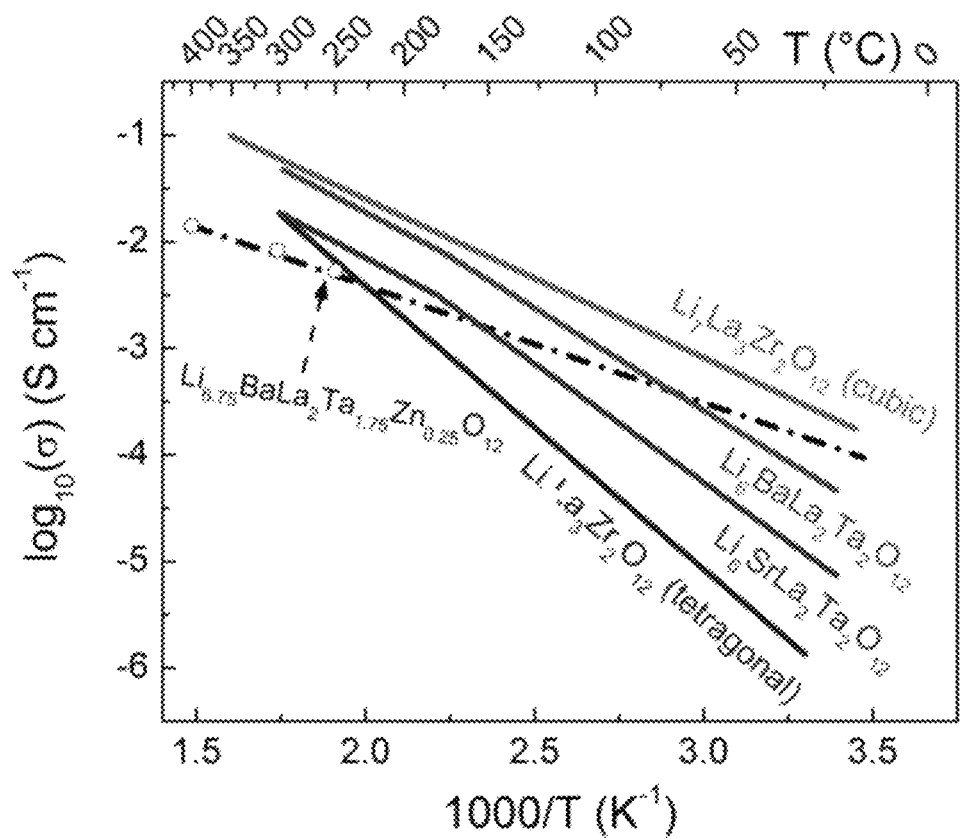
FIGS. 4A-B. (a) Ionic conductivity of examples of Li-garnets. (b) PXRD of an example of a $Li_{6.75}La_2BaTa_{1.75}Zn_{0.25}O_{12}$.
Figure 4B:
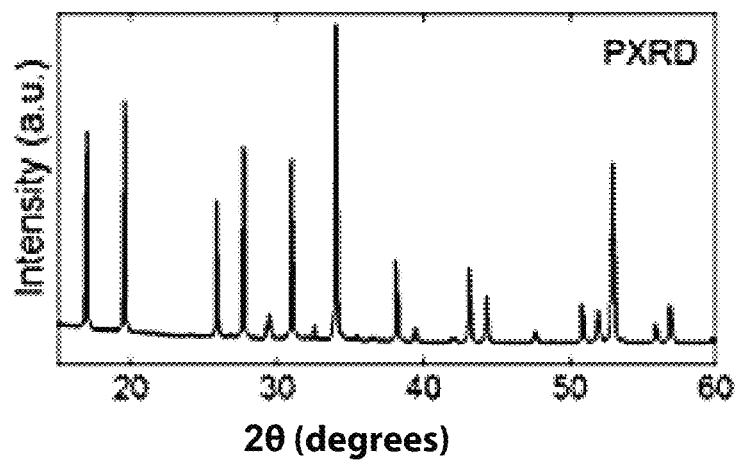

FIG. 4 shows the conductivity for Li garnets, including $Li_{6.75}BaLa_2Ta_{1.75}Zn_{0.25}O_{12}$. It is expected that the lower activation energy of this composition will provide a path to achieve RT conductivity of ~$10^{-2}$ Scm$^{-1}$ when similar substitutions are made in $Li_7La_3Zr_2O_{12}$.

Since garnet SSEs can be synthesized as ceramic powders (unlike LiPON) high-speed, scalable multilayer ceramic fabrication techniques can be used to fabricate supported thin-film (~10 μm) SSEs on tailored nano/micro-structured electrode scaffolds (FIG. 3). Tape casting 50 and 70 μm tailored porosity (nano/micro features) SSE support layers, followed by colloidal deposition of a ~10 μm dense SSE layer and sintering can be used. The resulting pinhole-free SSE layer will be mechanically robust due to support layers and have a low area specific resistance ASR, of only ~0.01 Ωcm$^{-2}$.

The ~6.0 volt cathode compositions ($Li_2MMn_3O_8$, M=Fe, Co) have been synthesized. These can be combined with SSE scaffold & graphene to increase ionic and electronic conduction, respectively, as well as to reduce interfacial impedance. $Li_2MMn_3O_8$ can be screen printed into the porous cathode scaffold and Li-metal impregnated in the porous anode scaffold.

Figure 5:
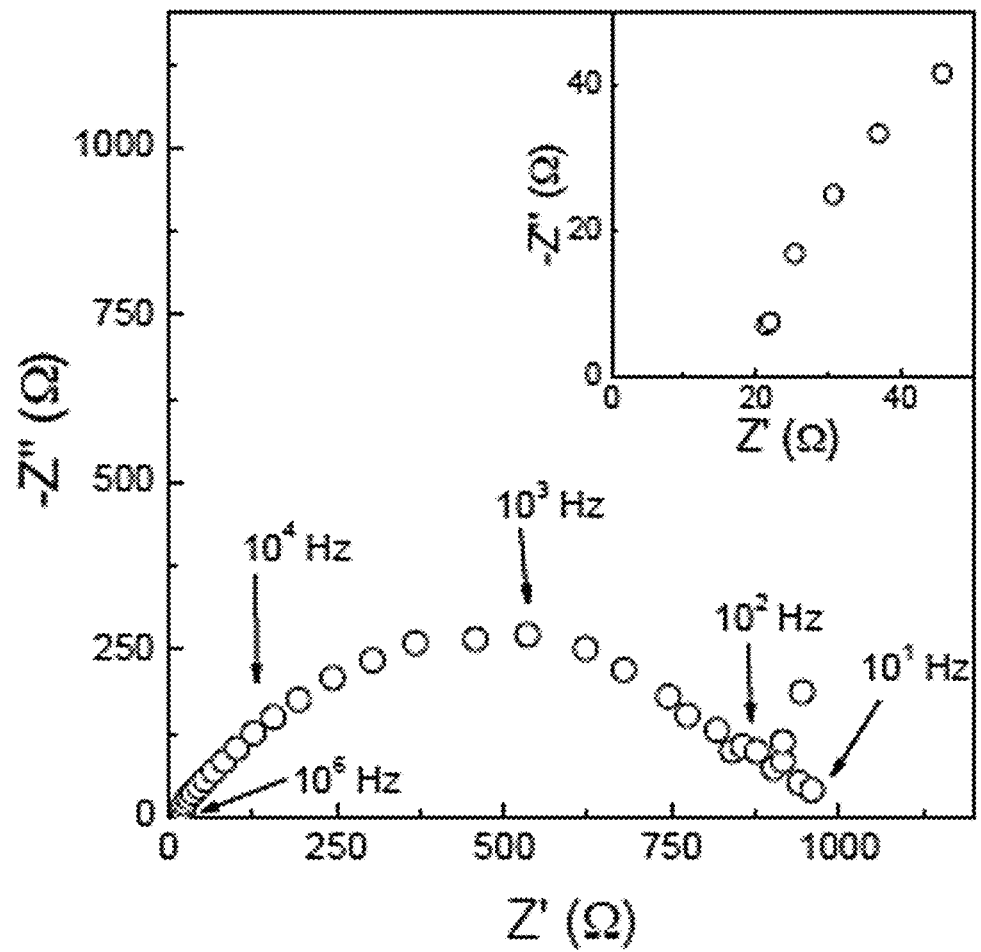
FIG. 5. Electrochemical impedance spectroscopy (EIS) of an example of a SSE battery with $LiFePO_4$ cathode (20% carbon black), dense SSE, Li infiltrated SSE scaffold, and Al current collector. The absence of additional low-frequency intercept indicates electrolyte interface is reversible for Li ions.

FIG. 5 shows EIS results for a solid state Li cell tested using the Li infiltrated porous scaffold anode, supporting a thin dense SSE layer, and screen printed LiFePO$_4$ cathode. The high-frequency intercept corresponds to the dense SSE impedance and the low frequency intercept the entire cell impedance.

Bipolar plates can be fabricated by electroplating ~200 Å Cu on ~40 μm Al. Given the 3× lower density of Al vs. Cu the resulting plate will have same weight as the sum of the ~10 μm Al and Cu foils used in conventional batteries. However, with 3× the strength (due to ~9× higher strength-to-weight ratio of Al vs. Cu). Increases in strength can be achieved by simply increasing Al plate thickness with negligible effect on gravimetric and volumetric energy density or cost. The repeat unit (SSLiB/bipolar plate) can be stacked in series to obtain desired battery pack voltage (e.g., fifty 6V SSLiBs for a 300V battery pack would be <1 cm thick).

In terms of performance and cost:

The energy density of SSLiBs shown in FIG. 3 is ~600 Wh/kg based on a 6 V cell. A $Li_2FeMn_3O_8$ cathode has a voltage of 5.5 V vs. Li. With this cathode, energy density of 550 Wh/kg can be achieved.

The calculation for energy density in Table 3 does not include packing for protection of thermal runaway and mechanical damage as this is not necessary for SSLiBs. If 20% packaging is included, the total energy density is still 500 Wh/kg.

The voltage drop of ~5 mV for C/3 was based on SSE with an ionic conductivity of ~$10^{-2}$ S/cm (using the porous SSE scaffold with dense SSE layer and corresponding small interfacial charge transfer resistance). At an ionic conductivity of $5\times10^{-4}$ S/cm, the voltage drop for C/3 rate is only ~0.1 V, which is significantly less than the cell voltage of 6 V.

The materials cost for SSLiBs is only ~50 $/KWh due to the high SSLiB energy density and corresponding reduction in materials to achieve the same amount of energy. The non-material manufacturing cost is expected, without the need of dry room, for our SSLiBs to be lower than that for current state-of-art LiBs.

The SSE materials can be synthesized using solid state and wet chemical methods. For example, corresponding metal oxides or salts can be mixed as solid-state or solution precursors, dried, and synthesized powders calcined between 700 and 1200° C. in air to obtain phase pure materials. Phase purity can be determined as a function of synthesis method and calcining temperature by powder X-ray diffraction (PXRD, D8, Bruker, Cuk$\alpha$). The structure can be determined by Rietveld refinements. Using structural refinement data, the metal-oxygen bond length and Li—O bond distance can be estimated to determine role of dopant in garnet structure on conductivity. In-situ PXRD can be performed to identify any chemical reactivity between the garnet-SSEs and the $Li_2(Fe,Co)Mn_3O_8$ high voltage cathodes as a function of temperature. The Li ion conductivity can be determined by electrochemical impedance spectroscopy (EIS-Solartron 1260) and DC (Solartron Potentiostat 1287) four-point methods. The electrical conductivity can be investigated using both $Li^+$ blocking Au electrodes and reversible elemental Li electrodes. The Li reversible electrode measurement will provide information about the SSE/electrode interface impedance in addition to ionic conductivity of the electrolyte, while the blocking electrode will provide information as to any electronic conduction (transference number determination). The concentration of $Li^+$ and other metal ions can be determined using inductively coupled plasma (ICP) and electron energy loss spectroscopy (EELS) to understand the role of Li content on ionic conductivity. The actual amount of Li and its distribution in the three different crystallographic sites of the garnet structure can be important to improve the conductivity and the concentration of mobile Li ions will be optimized to reach the RT conductivity value of $10^{-2}$ S/cm.

Figure 6:
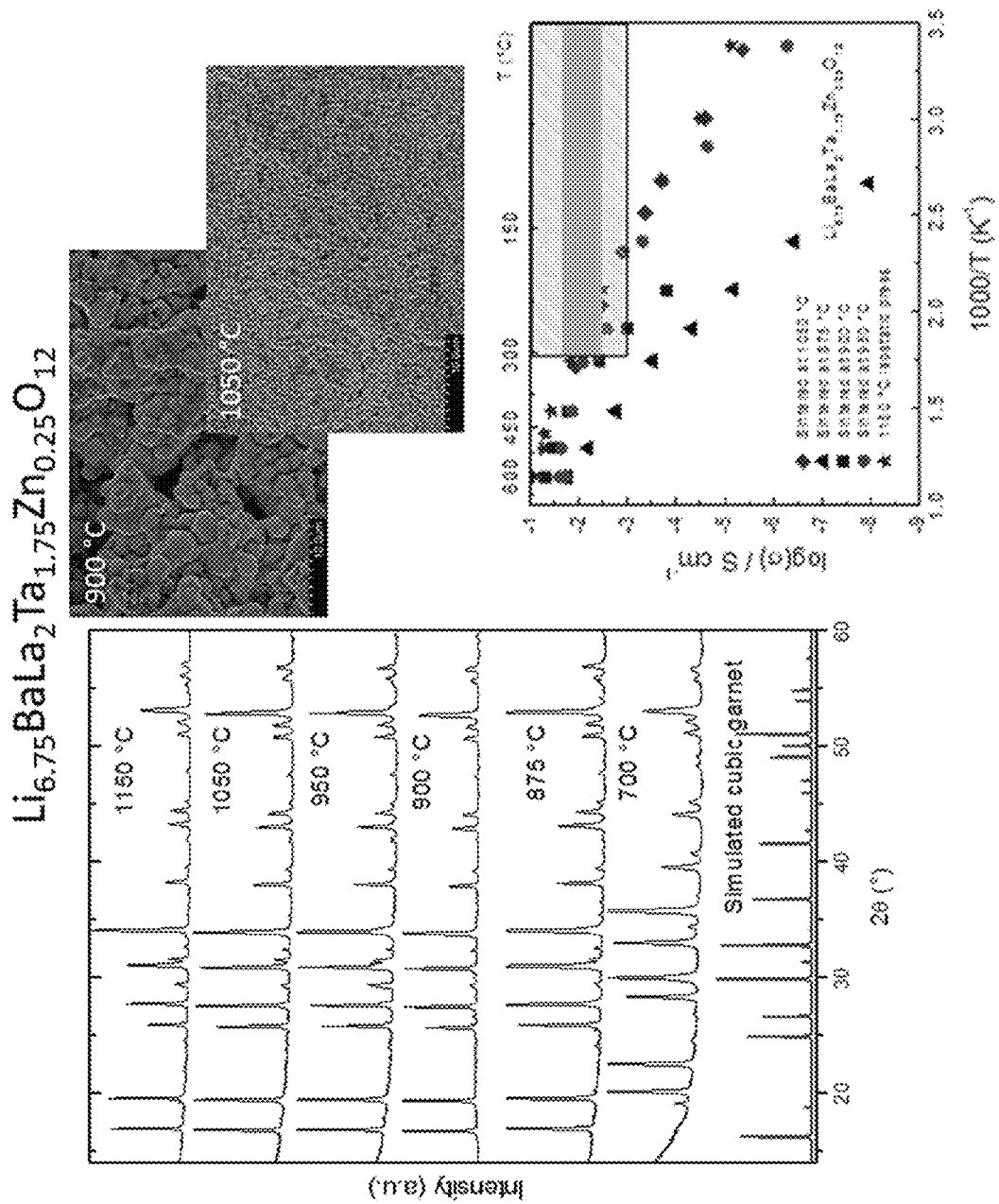
FIG. 6. PXRD showing the formation of a garnet-type $Li_{6.75}La_2BaTa_{1.75}Zn_{0.25}O_{12}$ as a function of temperature, SEM images and conductivity show sintering temperature can control the density, particle size, and conductivity.
Figure 7A:
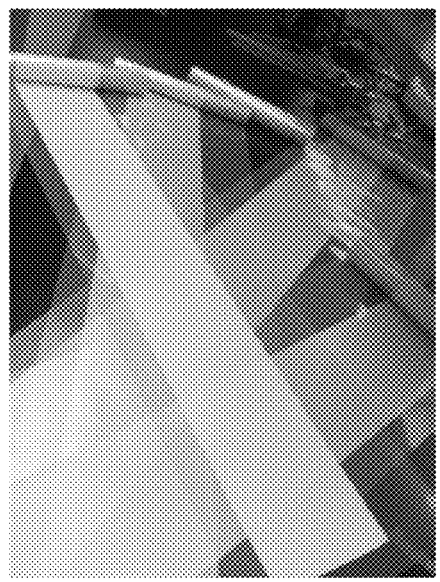
FIG. 7A-C. Examples of multilayer ceramic processing: (a) tape cast support; (b) thin electrolyte on layered porous anode support with bimodally integrated anode functional layer (BI-AFL); and (c) magnification of BI-AFL showing ability to integrate nano-scale features for reduced interfacial impedance with conventional ceramic processing.
Figure 7B:
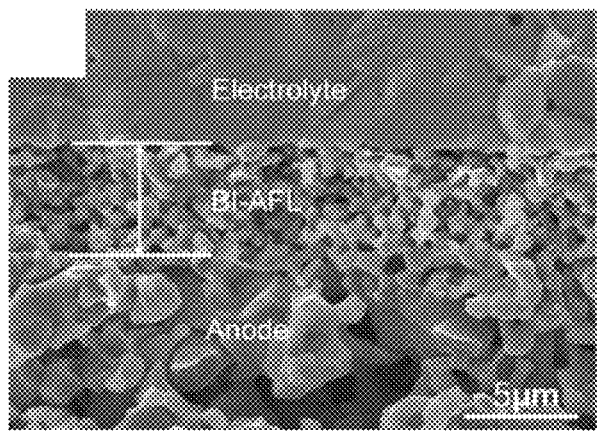
Figure 7C:
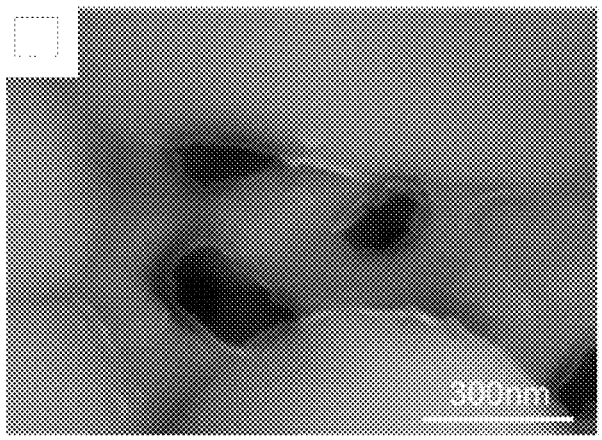

Sintering of low-density Li-garnet samples is responsible for a lot of the literature variability in conductivity (e.g., as shown in FIG. 6). The primary issue in obtaining dense SSEs is starting with submicron (or nano-scale) powders. By starting with nano-scale powders it is expected that the sintering temperature necessary to obtain fully dense electrolytes can be lowered. The nanoscale electrolyte and electrode powders can be made using co-precipitation, reverse-strike co-precipitation, glycine-nitrate, and other wet synthesis methods. These methods can be used to make desired Li-garnet compositions and to obtain submicron SSE powders. The submicron SSE powders can then be used in ink/paste formulations by mixing with appropriate binders and solvents to achieve desired viscosity and solids content. Dense thin-film (~10 μm) garnet SSEs on porous SSE scaffolds can be formed by tape casting (FIG. 7A), colloidal deposition, and sintering. The methods described can be used to create nano-dimensional electrode/electrolyte interfacial areas to minimize interfacial polarization (e.g., FIG. 7C). The symmetric scaffold/SSE/scaffold structure shown in FIG. 3 can be achieved by laminating a scaffold/SSE layer with another scaffold layer in the green state (prior to sintering) using a heated lamination press.

Cathode and anode integration. Nanosized (~100 nm) cathode materials $Li_2MMn_3O_8$ (M=Fe, Co) can be synthesized. With the SSE that is stable up to 6V, a specific capacity of 300 mAh/g is expected. Slurries of cathode materials can be prepared by dispersing nanoparticles in N-Methyl-2-pyrrolidone (NMP) solution, with 10% (weight) carbon black and 5% (weight) Polyvinylidene fluoride (PVDF) polymer binder. The battery slurry can be applied to cathode side of porous SSE scaffold by drop casting. SSE with cathode materials can be heated at 100° C. for 2 hours to dry out the solvent and enhance electrode-electrolyte interfacial contact. Additional heat processing may be needed to optimize the interface. The viscosity of the slurry will be controlled by modifying solids content and binder/solvent concentrations to achieve a desired filling. The cathode particle size can be changed to control the pore filling in the SSE. In an example, all of the mobile Li will come from cathode (the anode SSE scaffold may be coated with a thin layer of graphitic material by solution processing to "start-up" electronic conduction in the cell). In another example, a thin layer of Li metal will be infiltrated and conformally coated inside anode SSE scaffold. Mild heating (~400° C.) of Li metal foil or commercial nanoparticles can be used to melt and infiltrate the Li. Excellent wetting between Li-metal and SSE is important and was obtained by modifying the surface of the SSE scaffold (FIG. 8). To fill the SSE pores in the anode side with highly conductive graphitic materials, a graphene dispersion can be prepared by known methods. For example, 1 mg/mL graphene flakes can be dispersed in water/IPA solvent by matching the surface energy between graphene and the mixed solvent. Drop coating can be used to deposit conductive graphene with a thickness of ~10 nm inside the porous SSE anode scaffold. After successfully filling the scaffold pores, the cell can be finished with metal current collectors. Al foil can be used for the cathode and Cu foil for the anode. Bipolar metals can be used for cell stacking and integration. To improve the electrical contact between electrodes and current collectors, a thin graphene layer may be applied. The finished device may be heated up to 100° C. for 10 minutes to further improve the electrical contact between the layers. The electrochemical performance of the SSLiB can be evaluated by cyclic voltammetry, galvanostatic charge-discharge at different rates, electrochemical impedance spectroscopy (EIS), and cycling performance at C/3. EIS can be used in a broad frequency range, from 1 MHz to 0.1 mHz, to investigate the various contributions to the device impedance, and reveal the interfacial impedance between the cathode and SSE by comparing the EIS of symmetrical cells with Li-metal electrodes. The energy density, power density, rate dependence, and cycling performance of each cell, as a function of SSE, electrode, SSE-electrolyte interface, and current collector-electrode interface can be determined.

Multi-cell (2-3 cells in series) SSLiBs with Al/Cu bipolar plates can be fabricated. The energy/power density and mechanical strength can be determined as a function of layer thicknesses and area.

Further Embodiments

Recent advancements have been made in lithium-garnet interfaces, but improvements to the conductivity, thermal stability and/or capacity of cathode materials is desirable. The battery cells, systems and component elements described herein are directed toward improving these and other issues, offering a battery system capable of operating more safely and/or more reliably at high temperatures and with improved performance. The presently disclosed subject matter relates generally to a battery system, component electrodes and electrolytes, and their methods of use and manufacture. In certain embodiments, the battery system is a fully solid-state lithium-metal battery system. In certain embodiments, the battery system includes a garnet-based solid state electrolyte. In certain embodiments, the battery system includes a solution-processed cathode. In certain embodiments, the battery system includes an ionic liquid.

An all solid-state battery provides a promising option to use Li metal as anode for lithium batteries towards high energy and high power densities, compared to conventional lithium-ion batteries. Among all solid electrolyte materials ranging from sulfides to oxides and oxynitrides, cubic garnet $Li_7La_3ZnO_{12}$ (LLZO) phase based ceramic electrolyte should be the most superior candidate due to high ionic conductivity ($10^{-3}$-$10^{-4}$ S/cm) and good stability against Li. However, garnet solid electrolyte generally has a poor contact with cathode materials, which causes high surface resistance.

In an embodiment disclosed herein is a solution-coated cathode capable of achieving a truly all solid-state Li metal battery using garnet solid state electrolytes (SSEs). The two dimensional (2D) layered cathode materials can result in a low interfacial resistance and shows mixed ionic-electronic (MIE) conductivity especially after lithiation to enable cycling of all solid state batteries without a liquid or polymer electrolyte interface. Solution-processed carbon nanotubes offer a conformal coating for an efficient cathode-current collector interface with enhanced charge transport kinetics. Any MIE conductive materials, including $TiS_2$, $MoS_2$, $WS_2$, Vanadium sulfides, $ZrS_2$, Nb $S_2$, $TaS_2$ CuS, FeS, NiS, and other metal sulfides and these metal sulfides coated cathode materials (Sulfur (S), $Li_2S$) or their mixture/composites cathodes, can be used as the cathodes for truly all solid state batteries with high MIE conductivity and low interfacial resistance. This disclosure discusses a main challenge of interface resistance between garnet solid state electrolytes and cathodes without using an unstable liquid or polymer interface, which can pave way to realize the truly all solid state Li metal batteries based on garnet SSEs.

The developed strategy can address the challenge of high interface resistance between cathode and solid state electrolyte. This battery system paves the way to the realization of a truly all solid state Li metal battery based on garnet SSEs for high energy densities and improved safety. An all solid state battery is a promising option to realize the use of Li metal as anode electrode due to the solid nature of electrolyte that can block Li dendrite effectively and meanwhile benefit from other prominent features including large electrochemical stability window (0-5V), superior thermal stability, and direct multiple stacking for high voltage. In addition, this non-liquid system allows battery to have better endurance at high voltage and high temperature, thus truly all solid state battery is featuring high energy and high safety compared to liquid electrolyte and some polymer electrolyte systems.

The following presents example embodiments of the battery system. The invention shall not be limited to the electrode and electrolyte materials presented hereafter.

One of the main challenges to develop all solid state lithium (Li) metal batteries is the poor contact and thus the high interfacial resistance between conventional slurry-based electrodes and solid state electrolytes (SSEs). Recently, significant improvements have been made toward effective Li-garnet interfaces. Due to the poor conductivity and rigid granular morphology of cathode materials, the cathode-garnet interface is much worse and has little progress. In this disclosure, among other things, we demonstrate an all solid state Li metal battery using a solution-coated $TiS_2$ cathode and garnet SSE. The two dimensional (2D) layered $TiS_2$ can result in a low interfacial resistance and shows mixed ionic-electronic (MIE) conductivity after lithiation to enable cycling of all solid state batteries without a liquid or polymer electrolyte interface, however this technology can also in some embodiments be used with a liquid or polymer electrolyte interface or an ionic liquid interface or electrolyte. Solution-processed carbon nanotubes offer a conformal coating for an efficient cathode-current collector interface with enhanced charge transport kinetics. Given the excellent chemical stability of the Li metal anode, garnet SSE, and $TiS_2$ cathode, the demonstrated all solid state batteries can work at high temperatures from 100° C. to 150° C. for 400 cycles at current densities up to 1 mA/cm².

Lithium (Li) metal batteries are one of the most promising and attractive candidates for future high energy density storage applications, given the high theoretical specific capacity (3.86 Ah/g) and the lowest reduction potential (−3.05 V) of Li metal. Solid state electrolytes (SSEs), especially cubic garnet phase SSEs, are one of the most effective and promising candidates to achieve safe Li metal batteries because of their non-flammability and ability to mechanically block Li dendrites. Moreover, garnet based SSEs also have excellent chemical stability with Li metal and high ionic conductivity comparable to liquid electrolytes. Nevertheless, unlike liquid-based systems, SSEs encounter new challenges including high interfacial resistance arising from the poor contact between SSE and electrodes. Due to the low melting point (180.5° C.) of Li metal, it can in some embodiments be advantages for the anode interface to be well addressed by a number of surface treatments to lower the Li-garnet interfacial resistance to several tens of Ω·cm² from greater than 1000 Ω·cm². Due to the high electronic and ionic conductivity of metallic Li, the poor contact and high interfacial resistance at the anode interface is possible, but can be improved or resolved after addressing the wetting of Li metal on garnet SSE.

Both the poor conductivity and rigid granular morphology of cathode powders result in high interfacial resistance and inefficient Li transport in solid state systems. Therefore, the cathode interface has become the main challenge to develop garnet-based all solid state batteries. To fabricate functional solid state batteries, polymer-ceramic composite electrolytes and solid-liquid hybrid electrolytes have been previously introduced to address the cathode-garnet interface in solid state batteries. However, these non-solid interfaces can in some embodiments introduce potential safety concerns in Li-metal batteries and/or sacrifice the temperature stability and/or wide potential window of all solid state electrolytes. Truly all solid state batteries do not use any liquid or gel electrolyte interface, but can face challenges such as poor interface contact and conductivities, especially at the cathode. There is no low-cost, high performance interface engineering solution at the cathode to date for garnet based all solid state batteries.

In an ideal solid state cathode for garnet based batteries, both the electronic and ionic conductivity of the cathode materials could be improved fundamentally to enable faster Li transport. In this work, we developed a truly all solid state Li metal battery using titanium sulfide ($TiS_2$), a mixed ionic-electronic conductor as the cathode material. As a two-dimensional (2D) material, $TiS_2$ has high electronic conductivity and was first studied for Li-ion battery cathodes by Stanley Whittingham four decades ago. Recently, it has been reapplied as a conductive coating to improve the performance of Li sulfur batteries. After lithiation, the layered structure enhances the ionic conductivity for Li transport. Therefore, $TiS_2$ is an effective cathode material for all solid state batteries and has been demonstrated by co-pressing with soft solid state electrolytes, including sulfide and $LiBH_4$ electrolytes. Here, we demonstrated a truly all solid state full battery with garnet-based SSE, which is known to be stable with Li metal and has a wide potential window. Unlike the former approaches requiring complex deposition techniques or post treatments, the cathode can be directly deposited on the surface of garnet SSE using a cost-effective and scalable solution-based process. Without any additional electrolytes, binders, or interfaces, all solid state batteries are successfully cycled at high temperatures from 100° C. to 150° C. with high current densities up to 1 mA/cm².

Figure 9:
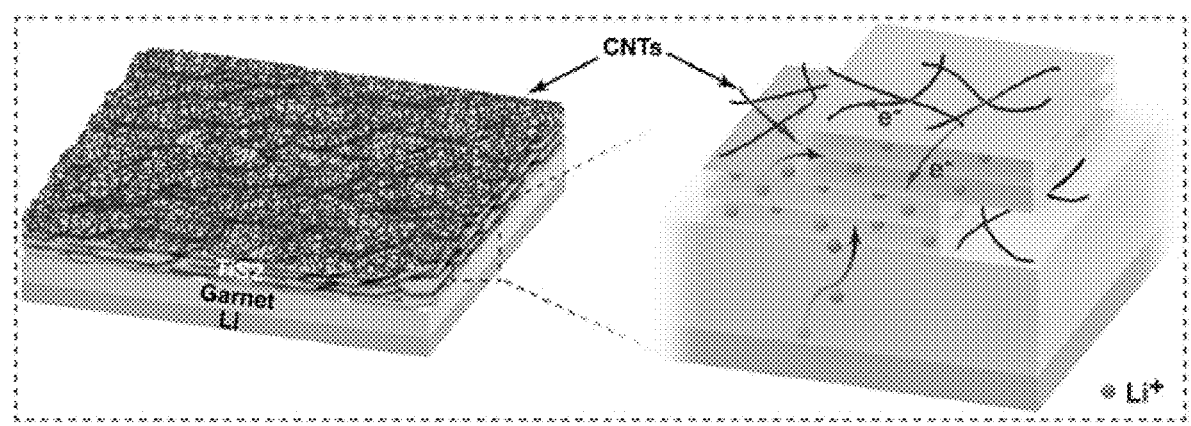
FIG. 9. Schematic of the LGTS (Li-Garnet-$TiS_2$) all solid state battery. The 2D structure of TiS2 ensures good contact with the garnet surface and between sheets, which improves Li ion transport. The CNTs (coated or not-coated) facilitate electron transport as an enhanced current collector.

FIG. 9 illustrates a schematic of an embodiment of a Li-Garnet-$TiS_2$ (LGTS) all solid state battery. Note that each component in this embodiment is homogeneous, which simplifies the Li transport process. The Li metal anode was coated on the surface of the garnet SSE following a previously reported method. Metallic Li is an excellent electronic and ionic conductor therefore, there are no concerns regarding the Li transport and charge transfer with the anode. As a mixed electronic-ionic conductor, the $TiS_2$ cathode can in some embodiments avoid any conductive additives, electrolyte, or binder. The two-dimensional (2D) sheet structure enables the $TiS_2$ cathode to have good contact with the garnet SSE and also facilitates Li transport across the interface and along the $TiS_2$ flakes. During the lithiation process, both the electronic and ionic conductivities of $TiS_2$ can be improved, which will further promote the electrochemical reaction at the cathode. Therefore, lithiation can be a self-promoted electrochemical process in the $TiS_2$ based all solid state battery. To ensure good electronic contact with the current collector, a thin layer of carbon nanotubes (CNTs) was also coated using a solution-based process on the $TiS_2$ cathode. Compared to a conventional metal foil current collector, the solution-processed CNTs have much lighter weight and can form a conformal coating on the cathode. Due to the capillary effect of the porous $TiS_2$ layer, some CNTs can partially penetrate into $TiS_2$ flakes, which can enable an interconnected electron pathway and further facilitate electron transport from the CNT network to the $TiS_2$ cathode. The solution-processed cathode and current collector are facile yet effective and critical to achieve the truly all solid state Li metal batteries.

FIG. 10A shows a photograph of an embodiment of the CNT and $TiS_2$ solutions from commercially available $TiS_2$ and P3-CNTs. In this embodiment, the precursors are sonicated and dispersed in N-Methyl-2-pyrrolidone (NMP) solvent before directly coating on garnet SSE in two steps, as shown in FIG. 10B. Prior to the solution-based coating of the cathode, the anode electrode was prepared by melting Li metal on the garnet SSE following a method reported separately, and can be performed as disclosed herein. A typical cross-sectional scanning electron microscopy (SEM) image of the Li-garnet interface is shown in FIG. 10C, with conformal contact of Li on the garnet surface. The continuous and tight contact results in an interfacial resistance as low as tens of $\Omega \cdot cm^2$ at the Li metal anode interface. After sonication and coating of the $TiS_2$ precursor on the garnet SSE, there is no further treatment of the solution-coated $TiS_2$ cathode. FIG. 10D provides evidence that sonication partially breaks and exfoliates $TiS_2$ flakes into a wide size distribution from sub-micrometer to about 20 μm. In the cross-sectional SEM image (FIG. 10E), the $TiS_2$ flakes overlap and form a well-connected film which ensures continuous pathways for Li and electron transport. Due to the capillary effect, some of the solution-coated CNTs can also be found between $TiS_2$ flakes and form a thin film of approximately 2 μm on the top of $TiS_2$ layer (FIG. 10E). This 2 μm lightweight CNT film can offer a sheet resistance of several tens of $\Omega/\square$.

Unlike most garnet based solid state batteries that depend on a liquid or polymer interface to facilitate Li transport, the LGTS batteries presented in this disclosure are truly all solid state batteries. To ensure fast enough Li transport, the batteries were cycled at temperatures between 100 to 150° C. A self-activation process for the $TiS_2$ cathode is observed during cycling. FIGS. 10F and 10G exhibit the voltage profiles of a LGTS battery cycled at a current density of 20 mA/g within different voltage ranges at 100° C. Initially, the battery was cycled from 1 to 4 V. The capacity of the LGTS battery during the first five cycles slowly increases but remains less than 30 mAh/g (FIG. 10F). At the sixth cycle, the discharge voltage was decreased to 0.35 V, and a discharge plateau at about 0.35 V is observed, significantly increasing the specific capacity to more than 300 mAh/g (FIG. 10G). In the following charge stage, the specific charge capacity also increased up to 208 mAh/g. After setting the discharge voltage back to 1 V for the seventh cycle, the specific discharge and charge capacities are still as high as 150 mAh/g and 141 mAh/g, respectively. Moreover, the discharge plateau increases to between 1.5 to 2 V, and the overpotential decreases significantly. These attributes of the LGTS batteries are indicative of a self-facilitating process. Since the pristine $TiS_2$ flakes do not contain Li ions, the initial lithiation process requires additional energy to intercalate the $TiS_2$ flakes, leading to a low discharge plateau. When the discharge voltage was set above 1 V, the $TiS_2$ flakes were barely activated, which results in a poor activation process and low specific capacities. When the discharge voltage was set below 0.35 V, a deep activation process was achieved, where most of the $TiS_2$ flakes were lithiated in one step. Since the lithiated $TiS_2$ flakes are mixed electronic-ionic conductors that can further facilitate Li transport and the activation process, a gradual activation process is also possible. To demonstrate this gradual activation process, additional LGTS batteries were tested with a potential window from 0.5 to 4 V at a current density of 50 mA/g. The first ten cycles exhibit a similar activation process as the specific capacity increases and the overpotential decreases (FIG. 10H). The Columbic efficiency also increases from 56 to 96%) in the first ten cycles. The irreversible capacity is accredited to make $TiS_2$ a Li ion conductor, which enables the following cycles to have a high Columbic efficiency.

Figure 11A:
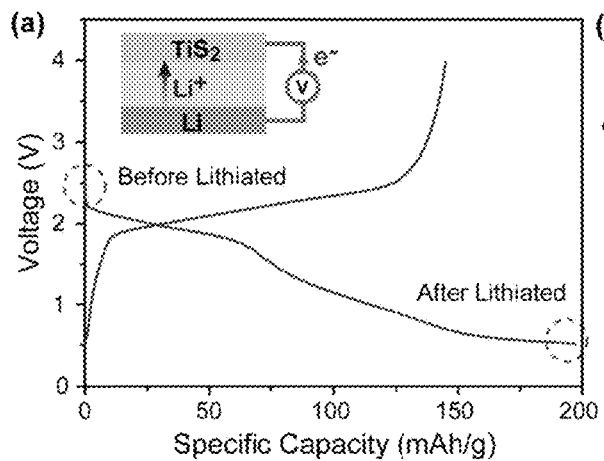
FIG. 11A-D. Investigating the change in conductivity of the $TiS_2$ film. (a) Voltage profile of the LGTS battery during the first cycle at 100° C. (b) EIS spectra of LGTS batteries before cycling (black) and after lithiation (blue), corresponding to the marked states in (a). The inset is the zoomed-in spectra marked by a red dashed line. (c) Schematic of the I-V measurement and lithiation process. (d) I-V curves of the $TiS_2$ film before and after lithiation, showing a significant improvement in the electronic conductivity after lithiation.
Figure 11B:
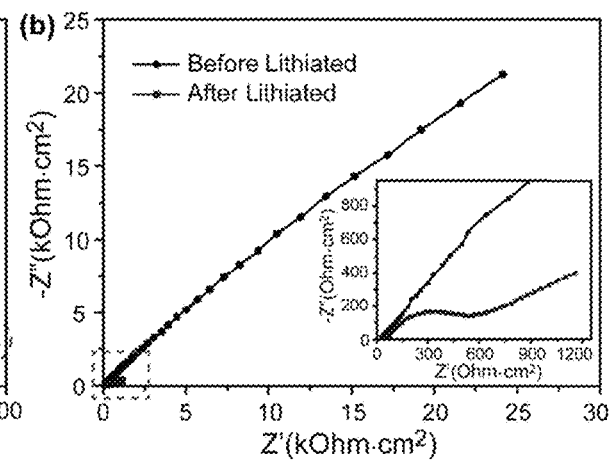
Figure 11C:
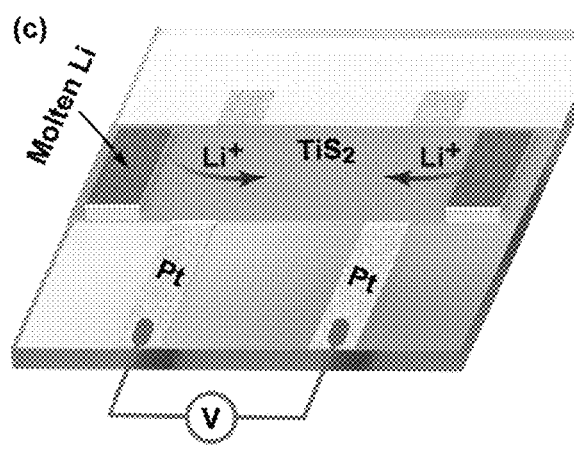
Figure 11D:
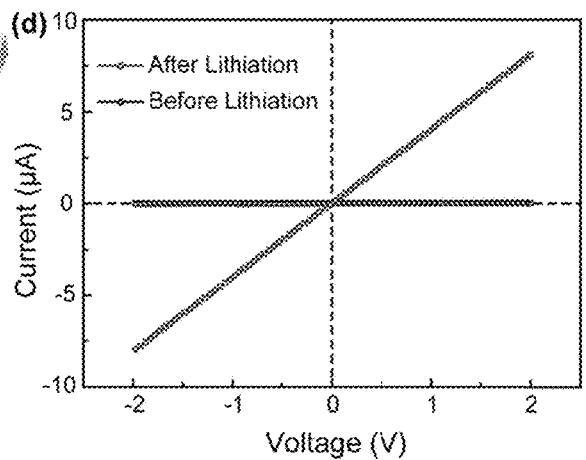

To better understand the self-improving behavior during the initial cycles in the LGTS batteries, we studied the change in ionic conductivity of $TiS_2$ after lithiation by electrochemical impedance spectroscopy (EIS) and the change in electronic conductivity by I-V measurements. The EIS spectra of the LGTS batteries measured before and after the first discharge at 100° C. are shown in FIG. 11b, and are marked on the voltage profile in FIG. 11A. The EIS of the as-made LGTS cell has a long diffusion tail indicating a large Li diffusion distance into the $TiS_2$ flakes before lithiation. After the first discharge, the EIS curve has a much shorter tail in the low frequency range and the overall resistance decreases 20 times from more than 25,000 $\Omega \cdot cm^2$ to only approximately 1,200 Ω·cm² (inset of FIG. 11B). A semicircle of approximately 600 Ω·cm² comes out, which should be the interfacial resistance between the lithiated TiS₂ cathode and garnet SSE. To further study the electronic conductivity change by I-V measurements, a TiS₂ thin film strip was coated on a glass substrate with two platinum electrodes (FIG. 11C). The lithiation process was simply performed by melting Li on the two ends of TiS₂ strip at about 250° C. so that Li can diffuse along the TiS₂ film. After contacting with molten Li for about 1 hour, even the TiS₂ film was not fully lithiated according to its color change, the electronic conductivity of the TiS₂ film significantly improves by a factor of 500 from $5.7 \times 10^{-5}$ S/cm to $2.9 \times 10^{-2}$ S/cm (FIG. 11D). Therefore, the pristine TiS₂ has relatively low electronic and ionic conductivity, which limits its electrochemical performance at the beginning. As the lithiation process goes, TiS₂ becomes an excellent mix ionic-electronic conductor, which further facilitates the charge transfer during cycling and therefore improves the electrochemical performance.

Given the good chemical stability of each component in a wide temperature range, one of the main advantages for the LGTS all solid state batteries is for high temperature applications. The ionic conductivity of garnet solid state electrolyte and the TiS₂ cathode are highly dependent on operating temperature. In this work, the LGTS all solid state batteries are tested at high temperatures up to 150° C., close to the melting point of lithium metal, 180.5° C. As shown in FIG. 12A, the EIS spectra of the LGTS batteries changes dramatically with temperature. When the temperatures were increased from 60° C. to 150° C., the resistance from the electrolyte and interfaces decreases from more than 6,000 Ω·cm² to less 100 Ω·cm². The diffusion tails also drop from more than 13,000 Ω·cm² to less than 500 Ω·cm². Therefore, the high temperature can significantly facilitate the Li transport, which activates every component including the garnet SSE, interfaces, and the TiS₂ cathode in the LGTS all solid state batteries.

Figures 14A, 14B, 14C:
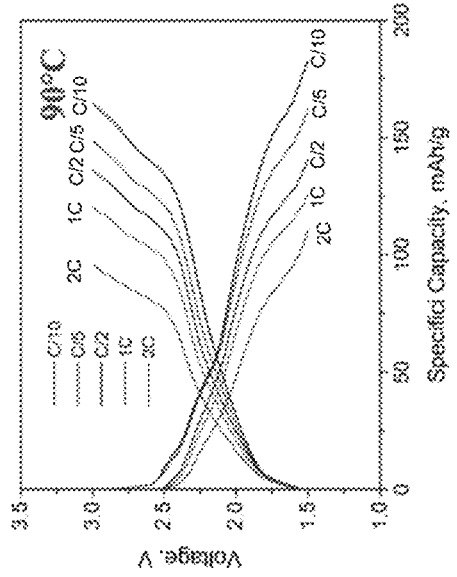
FIGS. 14A-D and 15 show specific capacity and Coulombic efficiency characteristics of an embodiment of a battery at different temperatures and current densities for multiple charge/discharge cycles.
Figure 15:
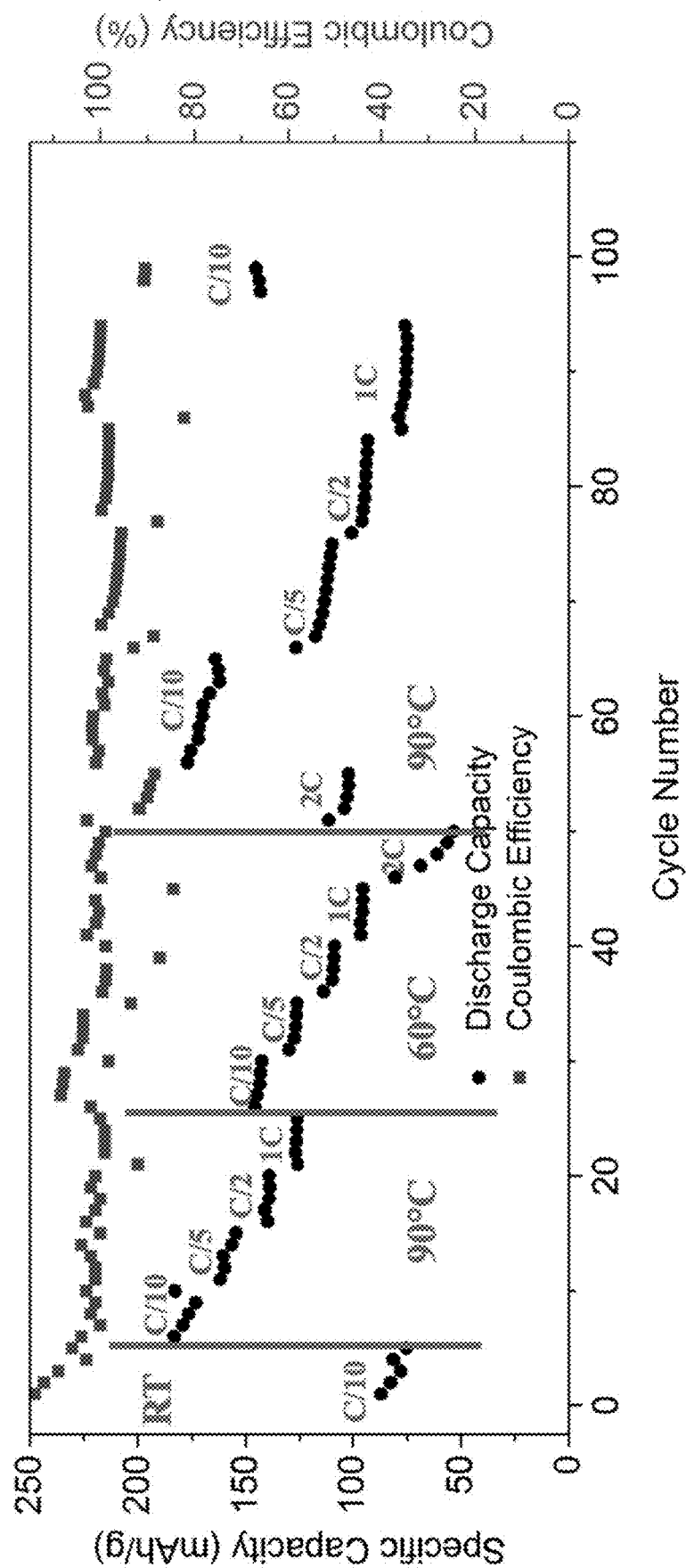

The LGTS battery activated at 100° C. in FIG. 10D was cycled at 150° C. under 300 mA/g, initially. The corresponding voltage profiles and cycling performance are shown in FIGS. 12B and 12C, respectively. Given the low overall resistance at high temperatures, the overpotential observed is relatively small for the LGTS batteries (FIG. 12B) and the specific capacity slowly increased from approximately 185 mAh/g to approximately 200 mAh/g after 60 cycles. The sudden increase in the specific capacity after the 60th cycle is due to unintended fluctuations in the heat source. When the current density was increased to 500 mA/g at 100th cycle, the specific capacity drops to approximately 180 mAh/g but then slowly increases to approximately 210 mAh/g in the next 200 cycles. A similar trend is observed after increasing the current density to 1000 mA/g, in which the initial and ending specific capacities are 175 and 185 mAh/g, respectively. The slow capacity increase should be due to the improvement of the interface and the further activation of the TiS₂ cathode during the cycling. The mass loading of the TiS₂ cathode is 1 mg/cm² and the current density for garnet SSE reaches 1 mA/cm², which is among the highest current densities achieved for garnet based all solid state batteries. As previously mentioned, the battery was pre-activated at 100° C. (FIG. 10d) and as a result, the Columbic efficiency during 400 cycles at 150° C. is close to 100%. This confirms the good reversibility and stability of TiS₂ cathode at high temperatures after the cathode activation process and for applications at room temperature, the LGTS batteries are shown in FIGS. 14A and 15 are also shown to have sufficient ionic conductivity to function effectively. Given the porosity of the TiS₂ cathode, the interface and conductivity of the cathode can be improved to enable LGTS batteries at room temperature.

Regarding batteries with liquid or polymer electrolytes, high temperatures can result in malfunction as well as serious safety concerns due to the flammability or volatility of organic and aqueous components, respectively. The significantly improved cycling performance of the LGTS battery at high temperatures demonstrates the reliability of truly al solid state batteries for certain high temperature applications, such as electric vehicles, military and aerospace exploration. To further demonstrate the outstanding stability and safety of the LGTS all solid state battery for commercial applications, a flame test was conducted. More specifically, the Li metal anode was sealed in polydimethylsiloxane (PDMS), while the TiS₂ cathode and CNTs current collector are exposed as shown in FIG. 12D. The as-made LGTS battery can successfully light a green light-emitting diode (LED) without any noticeable change while being directly heated by a flame. Instead, the temperature increase due to the flame improved the conductivity of the garnet SSE and therefore made the green LED much brighter (FIG. 12E). After removing the flame, the remained high temperature still keep the LED brighter (FIG. 12F). Therefore, the LGTS all solid state battery demonstrates good stability and high safety for high temperature applications.

After 400 cycles, an unstable, asymmetrical short-circuit was noticed in the aforementioned LGTS all solid state battery. The voltage profiles after the occurrence of the short-circuit are shown in FIGS. 13A and 13B. In each subsequent cycle, the battery is still stable up to 2 V and then diverges such that the charge capacity exceeds the theoretical capacity (FIG. 13A). The discharge profile is stable and the discharge capacity remains close to the values before the short-circuit, around 230 mAh/g (FIG. 13B). Without wishing to be limited by theory, we believe that a dynamic short-circuit mechanism that occurs when charged above approximately 2 V. The short-circuit in the cell is then removed after Li cycled back to cathode in the following discharge stage.

To further characterize the dynamic properties of the short circuit, EIS measurements with a bias voltage were conducted and shown in FIGS. 13C and 13Dd. Specifically, the short-circuited LGTS batteries were stopped at 2 V during the charge process, before the noisy short-circuit is formed, and then the EIS spectra were measured while applying a small bias voltage. Under no applied bias voltage, the EIS curve of the respective battery is stable and has normal diffusion tail. However, when a positive bias voltage (+0.2 V) is applied, the LGTS battery is put under a charged state, and the EIS curve starts to deviate and degrade particularly in the low frequency range (FIG. 13C). When a negative bias voltage (−0.2 V) applied, the battery is put under a state of discharge and the EIS curve recovers (FIG. 13D). The analysis from EIS further confirms that the unstable dynamic short-circuit forms during the charging process. The illustrations in FIGS. 13E and 13F schematically show the dynamic short-circuit evolution during charge-discharge process. While charging, Li is plated on Li-rich filament phases of the Li metal anode, which continue to grow toward the cathode and lead to short-circuits (FIG. 13E). When the battery is discharging, Li on the Li-rich filaments will be stripped first, which eliminates the short-circuit temporarily heals the short-circuit (FIG. 13F). This is the first time that asymmetrical short-circuit behavior has been observed in garnet-based all solid state Li metal batteries. Our future work will delve deeper into the transport of Li and the properties of dynamic short-circuits in solid state batteries using advanced tools such as neutron depth profiling. This dynamic short-circuit may result in low energy efficiency, but does not produce any serious safety concerns.

Figure 14D:
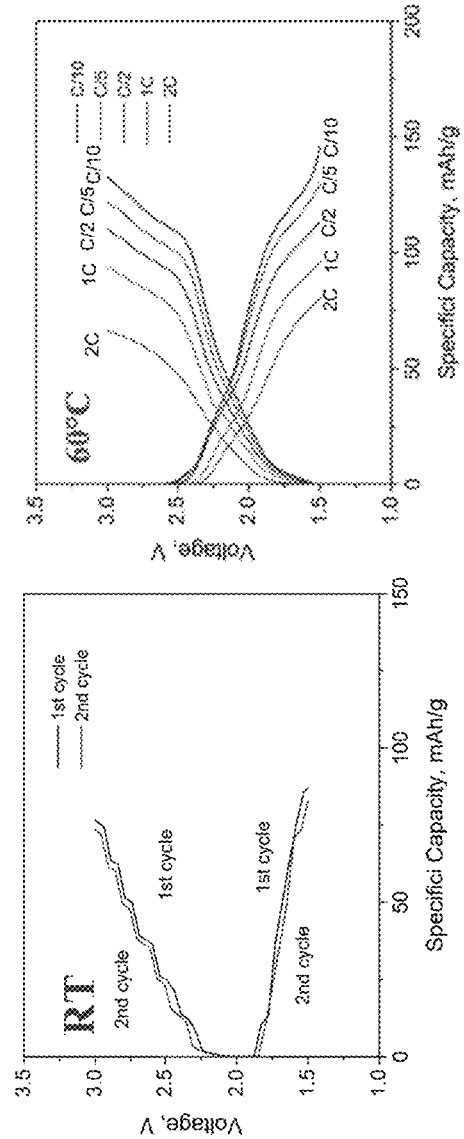

In a further embodiment, FIG. 14D shows an embodiment of a battery having a bi-layer solid solid-state electrolyte (solid state electrolyte was garnet electrolyte of $Li_{6.75}La_{2.75}Ca_{0.25}Zr_{1.75}Nb_{0.25}O_{12}$ stoichiometry, produced by methods described herein to result in a porous-dense bilayer structure was used, but other solid-state electrolytes, including those described herein can also be used) with a porous region and a dense region. The pores of the porous region were infiltrated with lithium metal and a cathode was formed on a face of the dense region opposite the porous region. The cathode included a mixture of $TiS_2$ and carbon nanotubes (CNT) with ionic liquid (Pyr1,4TFSI was used, but other ionic liquids that are chemically compatible with the solid-state electrolyte and the cathode material can also be used) present at 10 µL/cm². Testing of specific capacity and Coulombic Efficiency are shown in FIGS. 14A-C and 15. The battery was subjected to multiple charge/discharge cycles at different temperatures and different current densities. Temperatures tested were room temperature (RT), 60 and 90° C. Current densities tested included current densities to fully charge or discharge in 0.5 hr (2C), 1 hr (1C), 2 hr (C/2), 5 hr (C/5), and 10 hr (C/10.)

Figure 16:
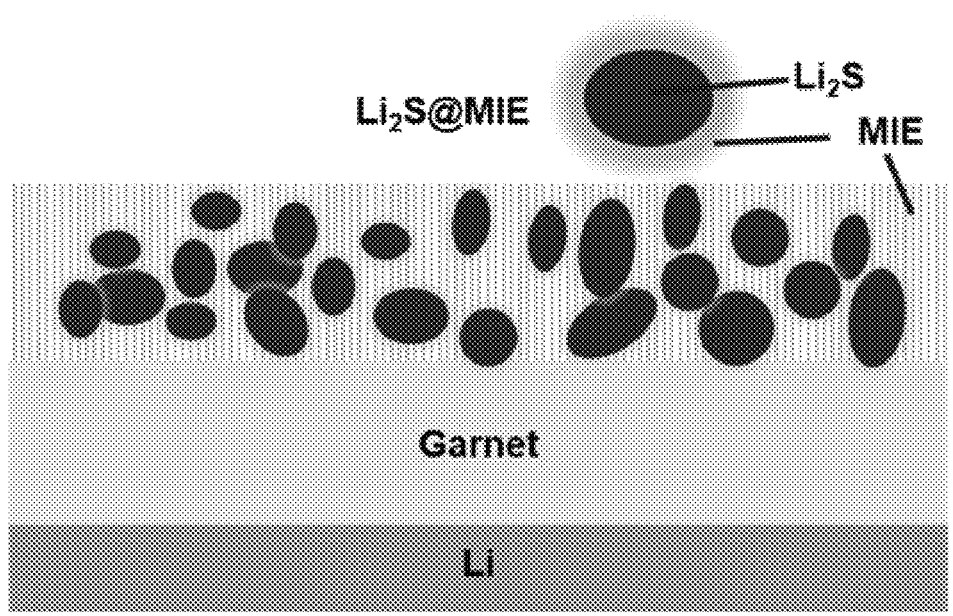
FIG. 16 shows an embodiment of an all solid state battery. The mixed electron-ion conductive cathode ensures good contact with the garnet surface and between themselves, which improves Li ion and electron transport. The coated CNTs facilitate electron transport as an enhanced current collector.

In a second further embodiment, FIG. 16 shows an embodiment of a battery having a lithium anode region located on a face of a solid-state electrolyte (SSE) (e.g. lithium-garnet), and a cathode on a face of the SSE opposite the anode, where the cathode include mixed ionic-electronic conductor (MIE) with sulfur particles embedded in the MIE. As shown in FIG. 16, the sulfur particle can be lithiated to a lithiated sulfur compound, such as $Li_2S$ compounds having other ratios of lithium to sulfur. In this embodiment, the MIE provides both electrical and ionic conductivity between a charge collector and the SSE, respectively and the sulfur/lithiated sulfur embedded in the MIE.

In summary, we successfully demonstrated an all solid state Li metal battery with garnet solid state electrolyte. The sonication-dispersed $TiS_2$ solution was directly coated on the garnet surface without any additional treatments or additives. Due to the 2D sheet structure of the $TiS_2$ flakes, there is plenty of contact area between the solid state cathode and garnet surface as indicated by the electrochemical performance. The solution-coated light weight CNTs thin film acts as a conformal current collector for the $TiS_2$ cathode and successfully addresses previous cathode-current collector interface issues. After lithiation, the $TiS_2$ cathode has sufficient MIE conductivity to cycle in LGTS all solid state batteries without any liquid or polymer electrolyte interfaces at 150° C. for 400 cycles. The excellent stability of the garnet SSEs and electrode materials in the LGTS all solid state batteries is confirmed at current densities up to 1 mA/cm². The non-flammability of each component is further demonstrated by flame tests under LED operating conditions. Asymmetrical dynamic short-circuits are observed and characterized for the first time in garnet based solid state batteries. Further work to investigate this short-circuiting phenomena will be key to developing practical all solid state Li metal batteries.

Example 2

Synthesis of garnet solid state electrolytes. Cubic phase garnet electrolyte of $Li_{6.75}La_{2.75}Ca_{0.25}Zr_{1.75}Nb_{0.25}O_{12}$ stoichiometry was synthesized by following previous methods. Specifically, stoichiometric amounts of $LiOH \cdot H_2O$ (Alfa Aesar, 98.0%), $La_2O_3$ (Alfa Aesar, 99.9%), $CaCO_3$ (Alfa Aesar, 99.0%), $ZrO_2$ (Inframat® Advanced Materials, 99.9%) and $Nb_2O_5$ (Alfa Aesar, 99.9%) were thoroughly ball milled in isopropanol for 24 h. To compensate for vitalization of lithium during the calcination and sintering processes, 10 wt % excess $LiOH \cdot H_2O$ was added. After the well-mixed precursors were dried, pressed and calcined at 900° C. for 10 h, the as-calcined pellets were broken down and ball-milled for 48 h in isopropanol. The dried powders were then pressed into 12.54 mm diameter pellets at 500 MPa, which were fully embedded in the mother powder and sintered at 1050° C. for 12 h. Alumina crucibles are used during the whole synthesis process. The as-made garnet pellets are about 1 cm in diameter and are mechanically polished on both sides to about 500 µm thickness for the battery testing.

Cell preparation. The $TiS_2$ solution was made from titanium sulfide powder (200 mesh, Sigma-Aldrich). A mixture of 100 mg $TiS_2$ powder and 5 mL N-Methyl-2-pyrrolidone (NMP) was bath sonicated (FS 110D, Fisher Scientific) for 1 hour. The final concentration of the as-made solution was 20 mg/mL The CNT solution was made by sonicating approximately 10 mg P3 (Carbon Solution) single wall carbon nanotubes (SWCNTs) in 5 mL NMP solvent with a probe sonicator (SONICS & MATERIALS, MODEL: VC505, 500 W) using the pulse mode (1 second on, 1 second off, 25% Amplitude) for approximately 20 min, which results in 2 mg/mL CNTs solution. To make LGTS all solid state batteries, one side of the fresh-polished garnet pellets was first coated with Li metal anode by following the previous method. Specifically, the garnet pellets were directly placed and smeared on the molten Li—Sn alloy (30-50 wt % of Sn) at about 250° C. for less than 1 minutes to ensure a conformal coating. Then the $TiS_2$ solution and CNT solution were sequentially coated on the other side of garnet pellet to achieve a mass loading of 1 mg/cm² for $TiS_2$ cathode and 0.1 mg/cm² for CNTs current collector.

Electrochemical measurement. Electrochemical tests of the LGTS batteries were conducted on a BioLogic VMP3 potentiostat. The electrochemical impedance spectra (EIS) were performed with a 30 mV AC amplitude in the frequency range of 100 mHz to 1 MHz. For the EIS measurement with bias voltage, +0.2 V or −0.2 V constant bias voltages were applied, while the other parameters are the same. Galvanostatic charge-discharge of the LGTS batteries was recorded at temperatures from 60 to 150° C. with current densities from 20 mA/g to 1000 mAV/g. The cells were placed in an argon filled glovebox to conduct all measurements. A small box furnace was used to control the temperatures. For the open flame burning test of the LGTS battery, the edges of the battery were sealed with Polydimethylsiloxane (PDMS). A green LED was attached and a lighter was used to burn the LGTS battery. To measure the electronic conductivity of the $TiS_2$ thin film strip before and after lithiation, a 5 cm×5 mm×15 µm $TiS_2$ thin film was coated on a glass substrate with two platinum electrodes. The lithiation process was conducted by melting Li on the two ends of $TiS_2$ strip at 250° C. for about 1 h followed by I-V measurements.

Materials characterization. The morphologies the Li anode-garnet cross section, $TiS_2$ cathode and CNTs current collector were conducted on a Tescan XEIA Plasma FIB/SEM at 10 kV.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

All ranges disclosed herein are inclusive of their upper and lower limits, and include each value there between to the hundredth decimal place, and all ranges within those limits.

Although the present disclosure has been described with respect to one or more particular embodiments and/or examples, it will be understood that other embodiments and/or examples of the present disclosure may be made without departing from the scope of the present disclosure.

As used herein, the words "approximately", "about", "substantially", "near" and other similar words and phrasings are to be understood by a person of skill in the art as allowing for an amount of variation not substantially affecting the working of the device, example or embodiment. In those situations where further guidance is necessary, the degree of variation should be understood as being 10% or less.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Use of the word "or" should be understood to also include the meaning "and", except where the context indicates otherwise. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims Concepts The present disclosure also includes at least the following concepts.

Concept 1-1. A solid-state, ion-conducting battery comprising:
 a) cathode material or anode material;
 b) a solid-state electrolyte (SSE) material comprising a porous region having a plurality of pores, and a dense region,
 wherein the cathode material or the anode material is disposed on at least a portion of the porous region and the dense region is free of the cathode material and the anode material, and
 c) a current collector disposed on at least a portion of the cathode material or the anode material.

Concept 1-2. The solid-state, ion-conducting battery of Concept 1-1, wherein the SSE material comprises two of the porous regions, the cathode material, the anode material, and the cathode material is disposed on at least a portion of one of the porous regions forming a cathode-side porous region and the anode material is disposed on at least a portion of the other porous region forming an anode-side porous region, and the cathode-side region and the anode-side region are disposed on opposite sides of the dense region, and further comprises a cathode-side current collector and an anode-side current collector.

Concept 1-3. The solid-state, ion-conducting battery of Concept 1-1, wherein the cathode material is a lithium-containing material, a sodium-containing cathode material, or a magnesium-containing cathode material.

Concept 1-4. The solid-state lithium ion battery of Concept 1-1, wherein the cathode material comprises a conducting carbon material, and the cathode material, optionally, further comprises an organic or gel ion-conducting electrolyte.

Concept 1-5. The solid-state, ion-conducting battery of Concept 1-3, wherein the lithium-containing electrode material is a lithium-containing, ion-conducting cathode material selected from $LiCoO_2$, $LiFePO_4$, $Li_2MMn_3O_8$, wherein M is selected from Fe, Co, and combinations thereof.

Concept 1-6. The solid-state, ion-conducting battery of Concept 1-3, wherein the sodium-containing cathode material is a sodium-containing, ion-conducting cathode material is selected from $Na_2V_2O_5$, P2-$Na_{2/3}Fe_{1/2}Mn_{1/2}O_2$, $Na_3V_2(PO_4)_3$, $NaMn_{1/3}Co_{1/3}Ni_{1/3}PO_4$, and $Na_{2/3}Fe_{1/2}Mn_{1/2}O_2$@graphene composite.

Concept 1-7. The solid-state, ion-conducting battery of Concept 1-3, wherein the magnesium-containing cathode material is a magnesium-containing, ion-conducting cathode material and is a doped manganese oxide.

Concept 1-8. The solid-state, ion-conducting battery of Concept 1-1, wherein the anode material is a lithium-containing anode material, a sodium-containing anode material, or a magnesium-containing anode material.

Concept 1-9. The solid-state, ion-conducting battery of Concept 1-8, wherein the lithium-containing anode material is lithium metal.

Concept 1-10. The solid-state, ion-conducting battery of Concept 1-8, wherein the sodium-containing anode material is sodium metal or an ion-conducting, sodium-containing anode material selected from $Na_2C_8H_4O_4$ and $Na_{0.66}Li_{0.22}Ti_{0.78}O_2$.

Concept 1-11. The solid-state, ion-conducting battery of Concept 1-8, wherein the magnesium-containing anode material is magnesium metal.

Concept 1-12. The solid-state, ion-conducting battery of Concept 1-1, wherein the SSE material is a lithium-containing SSE material, a sodium-containing SSE material, or a magnesium-containing SSE material.

Concept 1-13. The solid-state, ion-conducting battery of Concept 1-12, wherein the lithium-containing SSE material is a Li-garnet SSE material.

Concept 1-14. The solid-state lithium ion battery of Concept 1-12, wherein the Li-garnet SSE material is cation-doped $Li_5La_3M^1{}_2O_{12}$, where $M^1$ is Nb, Zr, Ta, or combinations thereof, cation doped $Li_6La_2BaTa_2O_{12}$, cation-doped $Li_7La_3Zr_2O_{12}$, and cation-doped $Li_6BaY_2M^1{}_2O_{12}$, where cation dopants are barium, yttrium, zinc, or combinations thereof.

Concept 1-15. The solid-state lithium ion battery of Concept 1-13, wherein said Li-garnet SSE material is $Li_5La_3Nb_2O_{12}$, $Li_5La_3Ta_2O_{12}$, $Li_7La_3Zr_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zr_2O_{12}$, $Li_{6.4}Y_3Zr_{1.4}Ta_{0.6}O_{12}$, $Li_{6.5}La_{2.5}Ba_{0.5}TaZrO_{12}$, $Li_6BaY_2M^1{}_2O_{12}$, $Li_7Y_3Zr_2O_{12}$, $Li_{6.75}BaLa_2Nb_{1.75}Zn_{0.25}O_{12}$, or $Li_{6.75}BaLa_2Ta_{1.75}Zn_{0.25}O_{12}$.

Concept 1-16. The solid-state, ion-conducting battery of Concept 1-1, wherein the current collector is a conducting metal or metal alloy.

Concept 1-17. The solid-state, ion-conducting battery of Concept 1-1, wherein the dense region of the SSE material has a dimension of 1 μm to 100 μm and/or the porous region of the SSE material that has the cathode material disposed thereon has a dimension of 20 μm to 200 μm and/or the porous region of the SSE material that has the anode material disposed thereon has a dimension of 20 μm to 200 μm.

Concept 1-18. The solid-state, ion-conducting battery of Concept 1-1, wherein the ion-conducting cathode material, the ion-conducting anode material, the SSE material, and the current collector form a cell, and the solid-state, ion-conducting battery comprises a plurality of the cells, each adjacent pair of the cells is separated by a bipolar plate.

Concept 1-19. A solid-state, ion-conducting battery comprising a solid-state electrolyte (SSE) material comprising a porous region of electrolyte material disposed on a dense region of electrolyte material, the SSE material configured such that ions diffuse into and out of the porous region of the SSE material during charging and/or discharging of the battery.

Concept 1-20. The solid-state, ion-conducting battery of Concept 1-19, where the SSE material comprises two porous regions disposed on opposite sides of the dense region of the SSE material.

Concept 2-1. A battery cell comprising:
a solid-state electrolyte (SSE) comprising:
  a solid-state dense region having a porosity of less than 5%; and a solid-state first porous region having a porosity of 40% to 90%;
a sulfide cathode contacting the SSE, wherein
an anode material is disposed in pores of at least a portion of the first porous region.

Concept 2-2. The battery cell of Concept 2-1, wherein the anode material comprises lithium metal.

Concept 2-3. The battery cell of Concept 2-1, wherein the anode material is lithium.

Concept 2-4. The battery cell of Concept 2-1, wherein the anode material comprises sodium metal.

Concept 2-5. The battery cell of Concept 2-1, wherein the anode material is sodium metal.

Concept 2-6. The battery cell of Concept 2-1, wherein the pores contain melted anode material.

Concept 2-7. The battery cell of Concept 2-1, wherein the sulfide cathode comprises a cathode material selected from the group consisting of $TiS_2$, $MoS_2$, $WS_2$, Vanadium sulfides, $ZrS_2$, $NbS_2$, $TaS_2$ CuS, FeS, and NiS.

Concept 2-8. The battery cell of Concept 2-3, wherein the sulfide cathode comprises a cathode material selected from the group consisting of $TiS_2$, $MoS_2$, $WS_2$, Vanadium sulfides, $ZrS_2$, $NbS_2$, $TaS_2$ CuS, FeS, and NiS.

Concept 2-9. The battery cell of Concept 2-3, wherein the sulfide cathode comprises a cathode material that is $TiS_2$.

Concept 2-10. The battery cell of Concept 2-1, wherein the battery cell is operable up to 300° C.

Concept 2-11. The battery cell of Concept 2-1, wherein the battery cell is operable up to 400° C.

Concept 2-12. A method of operating the battery cell of Concept 2-1 comprising discharging and charging the battery cell at a temperature up to 300° C.

Concept 2-13. A method of operating the battery cell of Concept 2-1 comprising discharging and charging the battery cell at a temperature up to 400° C.

Concept 2-14. A battery cell comprising:
a lithium garnet solid-state electrolyte (SSE);
an anode comprising a lithium metal anode material, the anode in contact with the lithium-garnet SSE;
a cathode comprising a cathode material that is a metal sulfide or an olivine, the cathode in contact with the lithium-garnet SSE.

Concept 2-15. The battery cell of Concept 2-14, wherein the SSE comprises pores with the pores containing lithium metal anode material in the melted state.

Concept 2-16. The battery cell of Concept 2-14, wherein the cathode material is the metal sulfide, and the cathode comprises a second cathode material that is sulfur, and the sulfur is present as particles within the metal sulfide.

Concept 2-17. The battery cell of Concept 2-14, wherein the battery cell is operable for charging and discharging at 150° C.

Concept 2-18. The battery cell of Concept 2-14, wherein the cathode material is the metal sulfide and the metal sulfide is a lithiated and/or non-lithiated form of a material selected from the group consisting of $TiS_2$, $MoS_2$, $WS_2$, Vanadium sulfides, $ZrS_2$, $NbS_2$, $TaS_2$ CuS, FeS, and NiS.

Concept 2-19. The battery cell of Concept 2-14, wherein the cathode material is the metal sulfide and the metal sulfide is lithiated and/or non-lithiated $TiS_2$.

Concept 2-20. The battery cell of Concept 2-14, wherein the cathode further comprises an elemental carbon-containing material located on a surface of the metal sulfide.

Concept 2-21. The battery cell of Concept 2-14, wherein the cathode material is the metal sulfide, and the cathode further comprises carbon nanotubes located on a surface of the metal sulfide.

Concept 2-22. The battery cell of Concept 2-14, wherein the cathode further comprises an electrically conductive carbon located on a surface of the metal sulfide.

Concept 2-23. The battery cell of Concept 2-14, wherein the battery cell is operable from 60 to 150° C. to charge and discharge the battery.

Concept 2-24. A method of operating the battery cell of Concept 2-14 comprising:
discharging or charging the battery cell at a temperature of 60-150° C.

Concept 2-25. The method of operating the battery cell of Concept 2-24 comprising:
discharging and charging the battery cell at a temperature of 80-150° C.

Concept 2-26. The method of operating the battery cell of Concept 2-14 comprising:

discharging and charging the battery cell at a temperature of 100-150° C.
Concept 2-27. The method of operating the battery cell of Concept 2-14 comprising:
discharging and charging the battery cell at a temperature of 150° C.
Concept 2-28. A method of operating the battery cell of Concept 2-14 comprising:
discharging the battery cell during or after contact with a flame.
Concept 2-29. A method of operating the battery cell of Concept 2-14 comprising discharging the battery after the battery experienced an internal short followed by charging the battery.
Concept 2-30. A method of making the battery cell of Concept 2-19 comprising:
solution-coating the $TiS_2$ onto the SSE at the cathode; and
coating the lithium metal onto the SSE at the anode.
Concept 2-31. A battery cell comprising:
a solid-state electrolyte (SSE) comprising:
a solid-state dense region and a solid-state first porous region;
a sulfide cathode contacting the SSE, wherein
the sulfide cathode comprises a lithiated and/or non-lithiated metal sulfide; and
an anode material is disposed in pores of at least a portion of the first porous region.
Concept 2-32. The battery cell of Concept 2-31, wherein the anode material comprises lithium metal.
Concept 2-33. The battery cell of Concept 2-31 or 2-32, wherein the metal sulfide comprises $TiS_2$.
Concept 2-34. The battery cell of Concept 2-31 or 2-32, wherein the metal sulfide is $TiS_2$.
Concept 2-35. A method of operating the battery cell of any one of Concepts 2-31, 2-32, 2-33 and 2-34 comprising discharging and/or charging the battery cell at a temperature of 60-90° C.
Concept 2-36. A method of operating the battery cell of any one of Concepts 2-31, 2-32, 2-33 and 2-34 comprising discharging and/or charging the battery cell at a temperature of 60-150° C.
Concept 2-37. A method of operating the battery cell of any one of Concepts 2-31, 2-32, 2-33 and 2-34 comprising discharging and/or charging the battery cell at a temperature of 90-150° C.
Concept 2-38. The method of operating a battery cell of any one of Concepts 2-35, 2-36, and 2-37, wherein the solid-state dense region has a porosity of less than 5%; and the solid-state first porous region has a porosity of 40% to 90%;

What is claimed is:

1. A battery cell comprising:
a solid-state electrolyte (SSE) comprising,
a solid-state dense region having a porosity of less than 5%; and
a solid-state first porous region having pores and a porosity of 40% to 90%;
a cathode contacting the SSE, wherein the cathode comprises a cathode active material selected from the group consisting of a lithiated and/or non-lithiated form of $TiS_2$, $MoS_2$, $WS_2$, vanadium sulfides, $ZrS_2$, $NbS_2$, $TaS_2$, CuS, and NiS; and
an anode material disposed in the pores of at least a portion of the solid-state first porous region.
2. The battery cell of claim 1, wherein the anode material comprises lithium metal.

3. The battery cell of claim 1, wherein the anode material is lithium metal.
4. The battery cell of claim 1, wherein the anode material comprises sodium metal.
5. The battery cell of claim 1, wherein the anode material is sodium metal.
6. The battery cell of claim 1, wherein the pores contain melted anode material.
7. The battery cell of claim 3, wherein the cathode active material is a lithiated and/or non-lithiated form of $TiS_2$.
8. The battery cell of claim 1, wherein the battery cell is operable up to 400° C.
9. A method of operating the battery cell of claim 1, comprising discharging and charging the battery cell at a temperature up to 300° C.
10. The battery cell of claim 1, wherein
the SSE is a lithium garnet solid-state electrolyte (SSE); and
the anode material comprises lithium metal.
11. The battery cell of claim 10, wherein the lithium metal anode material is in a melted state.
12. The battery cell of claim 10, wherein the battery cell is operable for charging and discharging at 150° C.
13. The battery cell of claim 10, wherein the cathode active material is a lithiated and/or non-lithiated form of $TiS_2$.
14. The battery cell of claim 10, wherein the battery cell is operable from 60 to 150° C. to charge and discharge the battery.
15. The method of claim 9 comprising: discharging and charging the battery cell at a temperature of 80-150° C.
16. The method of claim 9 comprising: discharging and charging the battery cell at a temperature of 100-150° C.
17. The method of claim 9 comprising: discharging and charging the battery cell at a temperature of 150° C.
18. The method of claim 9 comprising: discharging the battery cell during or after contact with a flame.
19. A battery cell comprising:
a solid-state electrolyte (SSE) comprising,
a solid-state dense region having a porosity of less than 5%; and
a solid-state first porous region having pores and a porosity of 40% to 90%;
a cathode contacting the SSE, wherein the cathode comprises a cathode active material selected from the group consisting of a lithiated and/or non-lithiated form of $TiS_2$, $MoS_2$, $WS_2$, vanadium sulfides, $ZrS_2$, $NbS_2$, $TaS_2$, CuS, and NiS, and wherein electrically conductive carbon is located on a surface of the cathode active material; and
an anode material disposed in the pores of at least a portion of the solid-state first porous region.
20. A battery cell comprising:
a solid-state electrolyte (SSE) comprising,
a solid-state dense region having a porosity of less than 5%; and
a solid-state first porous region having pores and a porosity of 40% to 90%;
a cathode contacting the SSE, wherein the cathode comprises a cathode active material selected from the group consisting of a lithiated and/or non-lithiated form of $TiS_2$, $MoS_2$, $WS_2$, vanadium sulfides, $ZrS_2$, $NbS_2$, $TaS_2$, CuS, and NiS, and wherein carbon nanotubes are located on a surface of the cathode active material; and
an anode material disposed in the pores of at least a portion of the solid-state first porous region.

21. A battery cell comprising:
a solid-state electrolyte (SSE) comprising,
- a solid-state dense region having a porosity of less than 5%; and
- a solid-state first porous region having pores and a porosity of 40% to 90%;

a cathode contacting the SSE, wherein the cathode comprises a cathode active material selected from the group consisting of a lithiated and/or non-lithiated form of $TiS_2$, $MoS_2$, $WS_2$, vanadium sulfides, $ZrS_2$, $NbS_2$, $TaS_2$, CuS, and NiS, wherein sulfur particles are present within the cathode active material; and an anode material disposed in the pores of at least a portion of the solid-state first porous region.

\* \* \* \* \*